US012581280B2

(12) United States Patent
Lin et al.

(10) Patent No.: US 12,581,280 B2
(45) Date of Patent: Mar. 17, 2026

(54) COMMUNICATION METHOD AND APPARATUS, AND ELECTRONIC DEVICE

(71) Applicant: Huawei Technologies Co., Ltd., Shenzhen (CN)

(72) Inventors: Dawei Lin, Wuhan (CN); Deng Chen, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 370 days.

(21) Appl. No.: 18/034,507

(22) PCT Filed: Oct. 27, 2021

(86) PCT No.: PCT/CN2021/126777
§ 371 (c)(1),
(2) Date: Apr. 28, 2023

(87) PCT Pub. No.: WO2022/089494
PCT Pub. Date: May 5, 2022

(65) Prior Publication Data
US 2023/0396974 A1 Dec. 7, 2023

(30) Foreign Application Priority Data

Oct. 30, 2020 (CN) .......................... 202011193802.0

(51) Int. Cl.
*H04W 8/00* (2009.01)
*H04W 48/10* (2009.01)
(52) U.S. Cl.
CPC ........... *H04W 8/005* (2013.01); *H04W 48/10* (2013.01)

(58) Field of Classification Search
CPC ...... H04W 8/005; H04W 48/10; H04W 84/18
See application file for complete search history.

(56) References Cited

U.S. PATENT DOCUMENTS

| 2015/0172391 A1* | 6/2015 | Kasslin | ................. | H04W 8/005 |
| | | | | 370/338 |
| 2018/0014181 A1* | 1/2018 | Nakahara | ................ | H04W 8/22 |
| 2020/0154348 A1* | 5/2020 | Choi | ....................... | H04W 4/80 |

FOREIGN PATENT DOCUMENTS

| CN | 102651785 A | 8/2012 |
| CN | 105183136 A | 12/2015 |
| CN | 110557263 A | 12/2019 |

* cited by examiner

*Primary Examiner* — Jae Y Lee
*Assistant Examiner* — Nick Anon Sundara
(74) *Attorney, Agent, or Firm* — Slater Matsil, LLP

(57) ABSTRACT

Embodiments of this application provide a communication method and apparatus, and an electronic device. The method includes: releasing a detection request packet by broadcast based on a Bluetooth low energy technology, where the detection request packet is a BLE broadcast packet including a network identifier of a device network on which online device detection is performed; receiving, based on the Bluetooth low energy technology, a detection response packet that is released by broadcast and that includes the network identifier, where the detection response packet is a BLE broadcast packet, and the detection response packet is a response packet generated, based on the detection request packet after the detection request packet is received, by an online device in the device network on which online device detection is performed; and determining the online device in the device network based on the detection response packet.

20 Claims, 8 Drawing Sheets

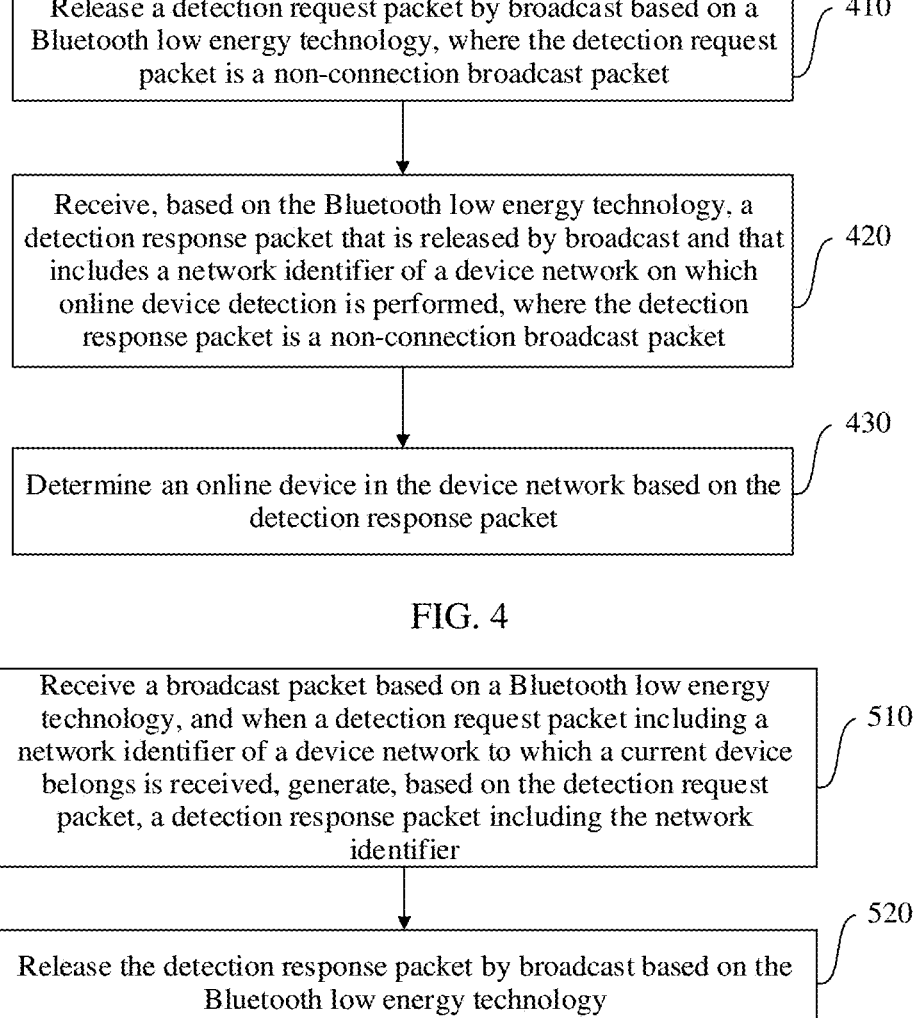

Release a detection request packet by broadcast based on a Bluetooth low energy technology, where the detection request packet is a non-connection broadcast packet    410

Receive, based on the Bluetooth low energy technology, a detection response packet that is released by broadcast and that includes a network identifier of a device network on which online device detection is performed, where the detection response packet is a non-connection broadcast packet    420

Determine an online device in the device network based on the detection response packet    430

FIG. 4

Receive a broadcast packet based on a Bluetooth low energy technology, and when a detection request packet including a network identifier of a device network to which a current device belongs is received, generate, based on the detection request packet, a detection response packet including the network identifier    510

Release the detection response packet by broadcast based on the Bluetooth low energy technology    520

FIG. 5

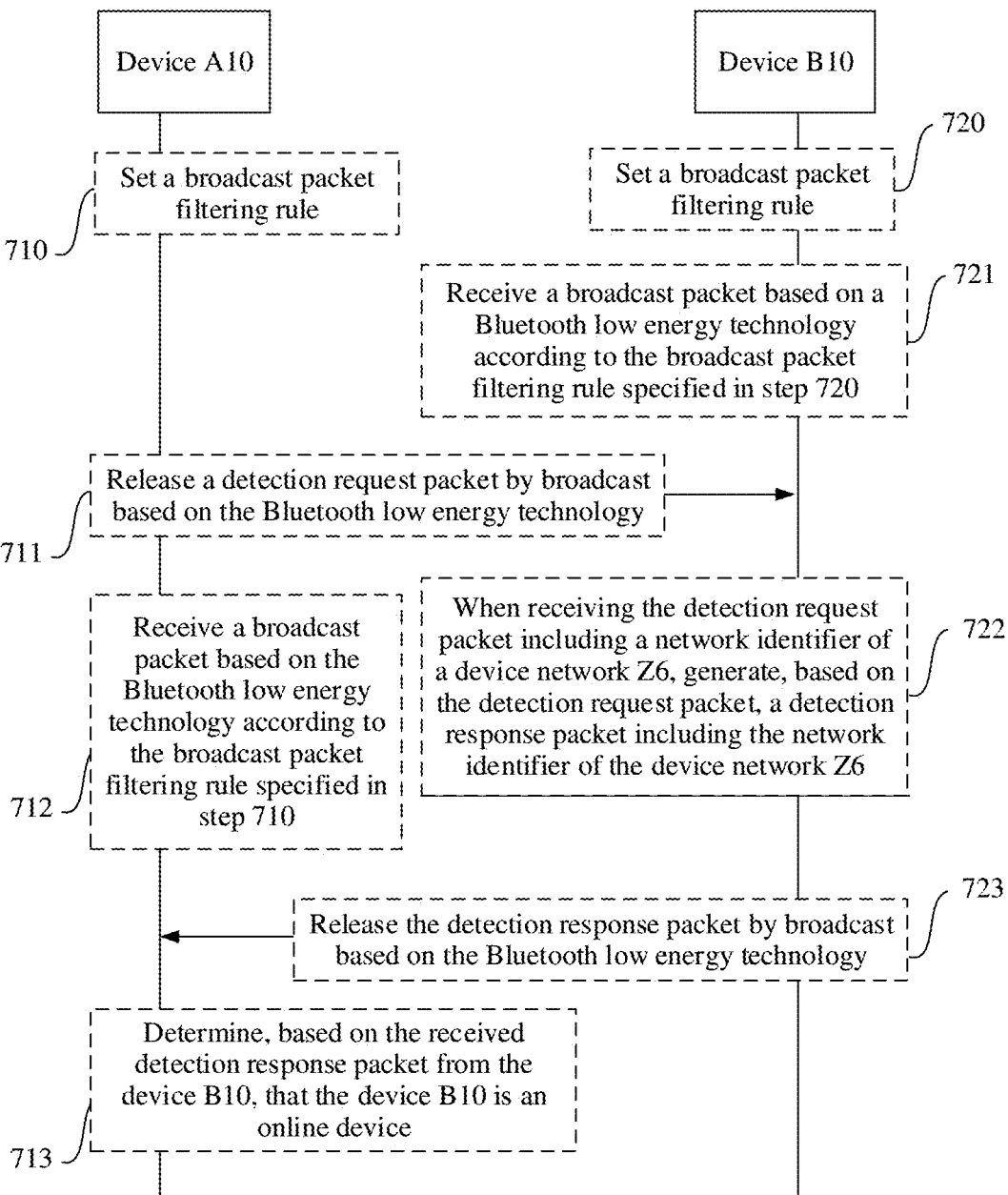

Device A10

Device B10

720

Set a broadcast packet filtering rule

710

Set a broadcast packet filtering rule

721

Receive a broadcast packet based on a Bluetooth low energy technology according to the broadcast packet filtering rule specified in step 720

Release a detection request packet by broadcast based on the Bluetooth low energy technology

711

Receive a broadcast packet based on the Bluetooth low energy technology according to the broadcast packet filtering rule specified in step 710

712

When receiving the detection request packet including a network identifier of a device network Z6, generate, based on the detection request packet, a detection response packet including the network identifier of the device network Z6

722

Release the detection response packet by broadcast based on the Bluetooth low energy technology

723

Determine, based on the received detection response packet from the device B10, that the device B10 is an online device

COMMUNICATION METHOD AND APPARATUS, AND ELECTRONIC DEVICE

CROSS-REFERENCE TO RELATED APPLICATIONS

This application is a National Stage of International Application No. PCT/CN2021/126777, filed on Oct. 27, 2021, which claims priority to Chinese Patent Application No. 202011193802.0, filed on Oct. 30, 2020, both of which are hereby incorporated by reference in their entireties.

TECHNICAL FIELD

Embodiments of this application relates to the communication field, and in particular, to a communication method and apparatus, and an electronic device.

BACKGROUND

The Internet of Things (Internet of Things, IOT) is an information bearer based on the Internet, a conventional telecommunications network, and the like, and enables all common physical objects that can be independently addressed to form an interconnected network. The Internet of Things implements ubiquitous connections between things and between things and people through various types of possible network access, to implement intelligent perception, identification, and management of things and processes. In the Internet of Things, various devices perform networking in a short-distance communication manner (for example, all devices that log in to a same account in a home form a device network), to implement an application function of the Internet of Things in collaboration.

With the continuous development of Internet of Things technologies, application fields of the Internet of Things are continuously expanded, and the application function of the Internet of Things is continuously enriched. In some application scenarios of the Internet of Things, to implement collaborative work of a plurality of devices, before performing an application function, an application initiating device needs to first determine an online status of another device in a network, and determine whether the device is in the network. This requires a method for detecting an online device in an Internet of Things environment.

SUMMARY

For a problem, in the conventional technology, of how to detect an online device in an Internet of Things environment, this application provides a communication method and apparatus, and an electronic device.

The following technical solutions are used in embodiments of this application.

According to a first aspect, this application provides a communication method. The method includes:

releasing a detection request packet by broadcast based on a Bluetooth low energy technology, where the detection request packet is a BLE broadcast packet, the detection request packet includes a network identifier of a device network on which online device detection is performed, and the network identifier in the detection request packet is used to enable a device receiving the detection request packet to determine whether the device network at which the detection request packet is targeted is a device network to which the device receiving the detection request packet belongs;

receiving, based on the Bluetooth low energy technology, a detection response packet that is released by broadcast and that includes the network identifier, where the detection response packet is a BLE broadcast packet, and the detection response packet is a response packet generated, based on the detection request packet after the detection request packet is received, by an online device in the device network on which online device detection is performed; and determining the online device in the device network based on the detection response packet.

In a feasible implementation of the first aspect, data content types of the detection request packet and the detection response packet each are set to a user-defined type, and the network identifier is written into data content of the detection request packet and the detection response packet.

In a feasible implementation of the first aspect, the detection response packet includes a device identifier of a sending device of the detection response packet.

In a feasible implementation of the first aspect, the receiving, based on the Bluetooth low energy technology, a detection response packet that is released by broadcast and that includes the network identifier includes: receiving, based on the Bluetooth low energy technology, a detection response packet that is released by broadcast and that includes the network identifier of the device network on which online device detection is performed and a packet identifier of a current device.

In a feasible implementation of the first aspect, the detection request packet includes the packet identifier of the current device.

In a feasible implementation of the first aspect, the receiving, based on the Bluetooth low energy technology, a detection response packet that is released by broadcast and that includes the network identifier and a packet identifier of a current device includes:

receiving a Bluetooth low energy packet based on a preset first filter condition to receive the detection response packet, where the first filter condition includes:

the detection response packet is a BLE broadcast packet;

the detection response packet includes the packet identifier of the current device; and the detection response packet includes the network identifier of the device network on which online device detection is performed.

In a feasible implementation of the first aspect, based on a function module that can be enabled in a sleep state, the detection request packet is generated, and/or the online device in the device network is determined.

In a feasible implementation of the first aspect, the detection request packet is periodically released, the detection response packet is received, and the online device in the device network is determined at a preset first time interval.

In a feasible implementation of the first aspect, the method further includes:

receiving, based on the Bluetooth low energy technology, an online packet that is released by broadcast and that includes a network identifier of a device network to which the current device belongs, where the online packet is a BLE broadcast packet, and the online packet is a packet that is released periodically at a preset second time interval by an online device in the device network to which the current device belongs; and determining, based on the online packet, the online device in the device network to which the current device belongs.

According to a second aspect, an embodiment of this application provides a communication method. The method includes:

receiving a broadcast packet based on a Bluetooth low energy technology, when a detection request packet including a network identifier of a device network to which a current device belongs is received, generating, based on the detection request packet, a detection response packet including the network identifier, and releasing the detection response packet by broadcast based on the Bluetooth low energy technology, where the detection request packet is a BLE broadcast packet;

the detection response packet is a BLE broadcast packet; and the network identifier included in the detection response packet is consistent with that in the detection request packet, and the network identifier in the detection response packet is used to: when a device that releases the detection request packet receives the detection response packet, enable the device that receives the detection response packet to determine whether the detection response packet corresponds to the detection request packet.

In a feasible implementation of the second aspect, the detection response packet further includes a device identifier of the current device, and the device identifier in the detection response packet is used to enable the device that releases the detection request packet to identify an identity of the current device when the device that releases the detection request packet receives the detection response packet.

In a feasible implementation of the second aspect, the detection request packet includes a packet identifier of the device that releases the detection request packet, and the packet identifier in the detection request packet is used to: when the device that releases the detection request packet receives the detection response packet, enable the device that releases the detection request packet to determine whether the detection response packet corresponds to the device that releases the detection request packet.

In a feasible implementation of the second aspect, the receiving a broadcast packet based on a Bluetooth low energy technology includes:

receiving a Bluetooth low energy packet based on a preset second filter condition to receive the detection request packet, where the second filter condition includes:

the detection request packet is a BLE broadcast packet; and the detection response packet includes the network identifier of the device network to which the current device belongs.

In a feasible implementation of the second aspect, the detection response packet is generated based on a function module that can be enabled in a sleep state.

In a feasible implementation of the second aspect, the method further includes:

periodically releasing an online packet by broadcast based on the Bluetooth low energy technology at a preset second time interval, where the online packet is a BLE broadcast packet; and the online packet includes the network identifier of the device network to which the current device belongs.

According to a third aspect, an embodiment of this application provides a communication apparatus. The communication apparatus includes:

a packet broadcasting module, configured to release a detection request packet by broadcast based on a Bluetooth low energy technology, where the detection request packet is a BLE broadcast packet, the detection request packet includes a network identifier of a device network on which online device detection is performed, and the network identifier in the detection request packet is used to enable a device receiving the detection request packet to determine whether the device network at which the detection request packet is targeted is a device network to which the device receiving the detection request packet belongs;

a packet receiving module, configured to receive, based on the Bluetooth low energy technology, a detection response packet that is released by broadcast and that includes the network identifier, where the detection response packet is a BLE broadcast packet, and the detection response packet is a response packet generated, based on the detection request packet after the detection request packet is received, by an online device in the device network on which online device detection is performed; and an online status determining module, configured to determine the online device in the device network based on the detection response packet.

According to a fourth aspect, an embodiment of this application provides a communication apparatus. The communication apparatus includes:

a packet broadcasting module, configured to: receive a broadcast packet based on a Bluetooth low energy technology; when a detection request packet including a network identifier of device network to which a current device belongs is received, generate, based on the detection request packet, a detection response packet including the network identifier; and release the detection response packet by broadcast based on the Bluetooth low energy technology, where the detection request packet is a BLE broadcast packet;

the detection response packet is a BLE broadcast packet; and the network identifier included in the detection response packet is consistent with that in the detection request packet, and the network identifier in the detection request packet is used to enable a device that releases the detection request packet to determine whether the detection response packet corresponds to the detection request packet.

According to a fifth aspect, an embodiment of this application provides a communication method. The method includes:

when a first device in a device network has an online device detection requirement, the first device releases a detection request packet by broadcast based on a Bluetooth low energy technology, where the detection request packet is a BLE broadcast packet, the detection request packet includes a network identifier of a device network on which online device detection is performed, and the network identifier in the detection request packet is used to enable a device receiving the detection request packet to determine whether the device network at which the detection request packet is targeted is a device network to which the device receiving the detection request packet belongs;

an online device in the device network receives a broadcast packet based on the Bluetooth low energy technology, where when an online second device in the device network receives the detection request packet, the second device generates, based on the detection request packet, a detection response packet including the network identifier, and releases the detection response packet by broadcast based on the Bluetooth low energy technology, where the detection response packet is a BLE broadcast packet, and the network identifier included in the detection response packet is consistent with that in the detection request packet; and the first device receives a broadcast packet based on the Bluetooth low energy technology, to obtain an online device detection result, where when the first device receives the detection response packet, the first device determines that the second device is online.

According to a sixth aspect, an embodiment of this application provides a communication method. The method includes:

when a first device in a device network has an online device detection requirement, the first device sends an online device detection request to a second device in the device network;

when the second device receives the online device detection request, the second device releases a detection request packet by broadcast based on a Bluetooth low energy technology, where the detection request packet is a BLE broadcast packet, the detection request packet includes a network identifier of a device network on which online device detection is performed, and the network identifier in the detection request packet is used to enable a device receiving the detection request packet to determine whether the device network at which the detection request packet is targeted is a device network to which the device receiving the detection request packet belongs;

an online device in the device network receives a broadcast packet based on the Bluetooth low energy technology, where when an online third device in the device network receives the detection request packet, the third device generates, based on the detection request packet, a detection response packet including the network identifier, and releases the detection response packet by broadcast based on the Bluetooth low energy technology, where the detection response packet is a BLE broadcast packet, and the network identifier included in the detection response packet is consistent with that in the detection request packet;

the second device receives a broadcast packet based on the Bluetooth low energy technology, to obtain an online device detection result, where when the second device receives the detection response packet, the second device determines that the third device is online; and the first device obtains the online device detection result from the second device.

According to a seventh aspect, this application provides an electronic device. The electronic device includes a memory configured to store computer program instructions and a processor configured to execute the program instructions. When the computer program instructions are executed by the processor, the electronic device is triggered to perform the steps of the method described in the first aspect.

According to an eighth aspect, this application provides an electronic device. The electronic device includes a memory configured to store computer program instructions and a processor configured to execute the program instructions. When the computer program instructions are executed by the processor, the electronic device is triggered to perform the steps of the method described in the second aspect.

According to the foregoing technical solutions provided in embodiments of this application, at least the following technical effects can be achieved.

According to the method in embodiments of this application, all online devices including a sleeping device in a specified device network can be determined. According to the method in embodiments of this application, it can be effectively avoided that an online sleeping device is missed when online device detection is performed, thereby greatly improving accuracy of an online device detection result. According to the method in embodiments of this application, a Bluetooth air interface capability of a device is not occupied, so that a normal Bluetooth function of the device is not affected.

BRIEF DESCRIPTION OF THE DRAWINGS

FIG. 4 is a flowchart of a method for detecting an online device according to an embodiment of this application;

FIG. 5 is a flowchart of a method for feeding back an online status according to an embodiment of this application;

FIG. 7 is a sequence diagram of an application scenario according to an embodiment of this application;

DETAILED DESCRIPTION OF ILLUSTRATIVE EMBODIMENTS

Figures 1, 2:
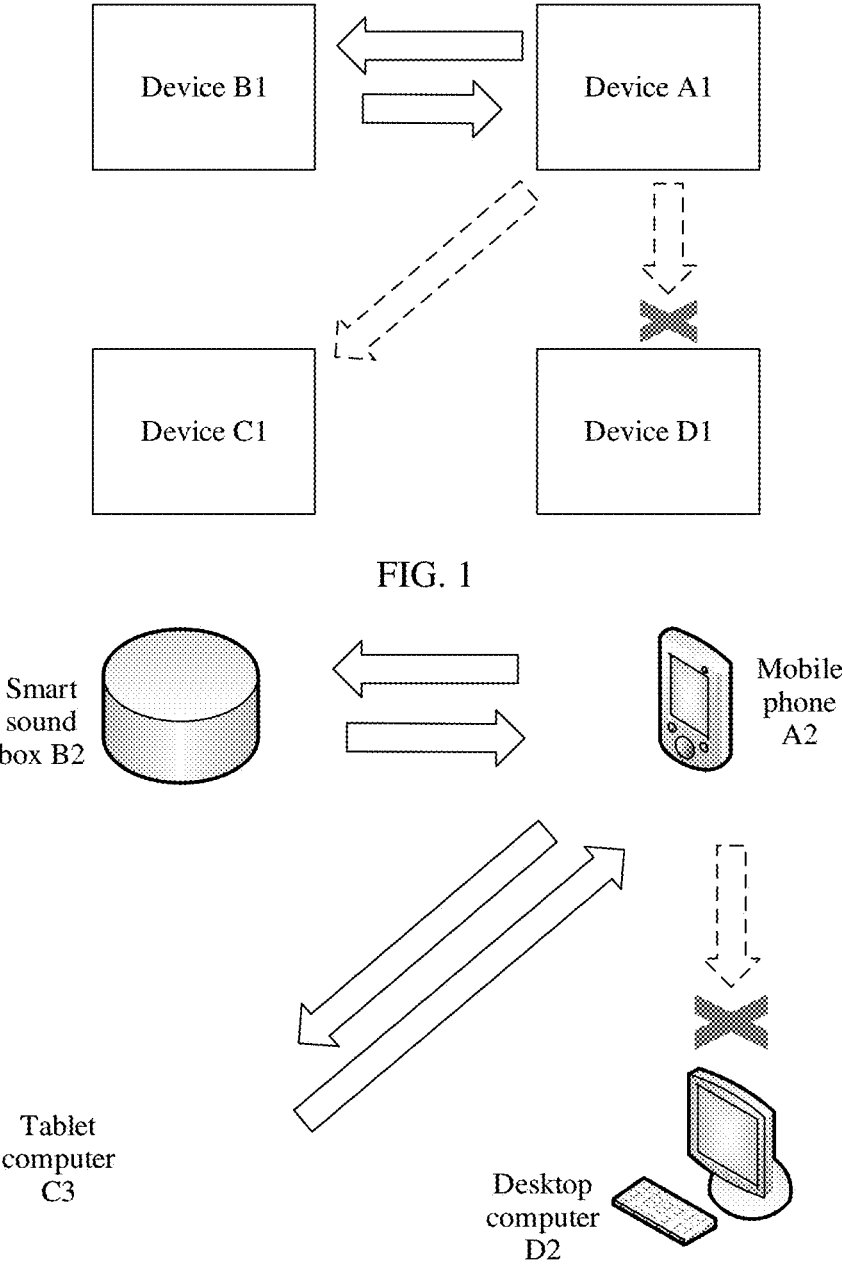
FIG. 1 is a schematic diagram of an application scenario according to an embodiment of this application.
FIG. 2 is a schematic diagram of an application scenario according to an embodiment of this application.

To make the objectives, technical solutions, and advantages of this application clearer, the following clearly and completely describes the technical solutions in this application with reference to specific embodiments and accompanying drawings in this application. It is clear that the described embodiments are merely some but not all of embodiments of this application. All other embodiments obtained by a person of ordinary skill in the art based on embodiments of this application without creative efforts shall fall within the protection scope of this application.

Terms used in embodiments of this application are only used to explain specific embodiments of this application, but are not intended to limit this application.

Embodiments of this application may be applied to the field of smart home. Embodiments of this application may be an electronic device such as a mobile phone, a tablet computer, a wearable device (for example, a watch, a band, a helmet, or an earphone), a vehicle-mounted device, an augmented reality (augmented reality, AR) device/a virtual reality (virtual reality, VR) device, a notebook computer, an ultra-mobile personal computer (ultra-mobile personal computer, UMPC), a netbook, a personal digital assistant (personal digital assistant, PDA), or a smart home device (for example, a smart desk lamp, a smart sound box, or a smart gateway). It may be understood that a specific type of the electronic device is not limited in embodiments of this application.

For a problem of how to detect an online device in an Internet of Things environment, a feasible solution is to perform device online detection by using a wireless (Wi-Fi) technology. For example, when a user indicates a smart sound box A00 to establish a stereo network, the smart sound box A00 sends a broadcast packet to a peripheral device by using a Wi-Fi module, and determines whether the device is online based on whether the peripheral device responds. The smart sound box A00 feeds back an online status of the peripheral device to the user, so that the user can choose which online devices are used to establish the stereo network, or the user can determine which devices need to be brought online to establish the stereo network.

In embodiments of this application, that the device is online means that the device is in a power-on state, and the device is connected to a device network, and may exchange data with another device in the device network.

For example, after the user goes home, the user uses a mobile phone to access a home local area network. When the user uses the mobile phone to access the home local area network, the mobile phone is an online device in the home local area network. When the mobile phone is powered off or the user leaves home, after the mobile phone of the user is disconnected from the home local area network, the mobile phone of the user is not the online device in the home local area network.

For another example, a smart sound box that is connected to the home local area network and that is playing music and a smart television that is playing a video are both online devices in the home local area network.

Further, after the device is connected to the device network, the device may enter a sleep state. In the sleep state, the device retains a communication function based on the device network and can be quickly woken up. The device in the sleep state is considered as an online device.

For example, after the mobile phone of the user accesses the home local area network, the user turns off a screen of the mobile phone, or the mobile phone automatically turns off the screen if the user does not use the mobile phone for a long time.

For another example, when the smart sound box connected to the home local area network does not need to play audio, the smart sound box automatically enters a sleep mode. The user presses a power-off button of the smart sound box to power off the smart sound box. Unlike being powered off, the smart sound box in the sleep mode is not powered off, and the smart sound box in the sleep state maintains a communication function to be quickly woken up.

For another example, when the user does not need to watch the video, the user presses a sleep button on a remote control, and the smart television in the home local area network enters the sleep mode under control of the user. The user presses a power-off button to power off the smart television. Unlike being powered off, the smart television in the sleep mode is not completely powered off, and only a screen and some function modules are turned off. The smart television in the sleep state maintains a communication function to be quickly woken up.

In some possible embodiments, the online device refers to an electronic device that is powered on and that accesses a local area network, and an offline device refers to an electronic device that is not powered on and/or that does not access the local area network.

In an actual application scenario, for some devices in the sleep state, although the devices retain their own communication functions to be quickly woken up, a Wi-Fi chip of the devices filters out a broadcast packet for power saving. As a result, the devices in the sleep state cannot respond to the broadcast packet of the device A00, so that the device A00 determines that the devices in the sleep state are not online.

As shown in FIG. 1, a device A1, a device B1, a device C1, and a device D1 belong to one device network (an IoT network). At a moment, the device A1 and the device B1 are online and in a non-sleep state (for example, the device A1 and the device B1 are mobile phones, and both are in a screen-on state), the device C1 is in an online sleep state (for example, the device C1 is a notebook computer, and is in a sleep state), and the device D1 is powered off and offline (for example, the device C1 is a desktop computer, and the desktop computer is in a power-off state). When the device A1 needs to determine an online device in the Internet of Things environment, the device A1 sends a broadcast packet to a peripheral device through Wi-Fi. The device B1 is in a working state, receives the broadcast packet of the device A1, and feeds back a response packet to the device A1. The device D1 is in a power-off offline state, and the broadcast packet of the device A1 cannot be sent to the device D1. The device C1 is in an online sleep state (for example, a main processor enters an energy-saving state, but does not power off the device and a communication interface, and is in a state that can be woken up at any time). Although the broadcast packet of the device A1 can be sent to the device C1, a Wi-Fi chip of the device C1 in the sleep state filters out the broadcast packet for power saving. Therefore, the device C1 cannot receive the broadcast packet of the device A1 and feed back a response packet to the device A1. Finally, the device A1 receives only the response packet from device B1 after releasing the broadcast packet. Therefore, the device A1 determines that the online device is the device B1, and omits the online sleeping device C1.

For the foregoing problem, a feasible solution is to perform device online detection by using a Bluetooth low energy (Bluetooth Low Energy, BLE) technology. For example, a device A0 discovers a newly added device B0 and device C0 through Bluetooth BLE scanning. When the device B0 and the device C0 are disconnected, the device A0 can sense, based on a Bluetooth air interface packet change, that the device B0 and the device C0 are offline. Because power consumption of the Bluetooth BLE is low, enabling of the Bluetooth BLE is also supported in a sleep state of many devices. Therefore, an online device in the Internet of Things environment can be effectively detected based on the Bluetooth BLE.

Based on the Bluetooth BLE technology, although a device can sense offline of a peripheral device based on a Bluetooth air interface packet change, implementation of the foregoing solution needs to establish a Bluetooth persistent connection between devices. If there are a plurality of point-to-point connections between the devices, a conflict occurs between the connections. In addition, the Bluetooth persistent connection between the devices occupies a device air interface capability, which affects normal Bluetooth functions of the devices.

For the foregoing problem, in an embodiment of this application, the offline of the peripheral device is not sensed based on the Bluetooth air interface packet change, but an online device in an Internet of Things environment is actively detected based on a BLE broadcast packet. Specifically, an online device detection initiator device releases a detection request packet by broadcast based on a BLE technology. After receiving the detection request packet, an online device in a device network releases a detection response packet by broadcast based on the BLE technology. After receiving the detection response packet, the online device detection initiator device may determine that the releasing device of the detection response packet is an online device. In the foregoing process, both the detection request packet and the detection response packet are BLE broadcast packets (unconnectable generic broadcast packets). Therefore, a Bluetooth persistent connection does not need to be established between the online device detection initiator device and another online device in the device network, and a device air interface capability is not occupied, so that a normal Bluetooth function of the device is not affected.

As shown in FIG. 2, a mobile phone A2, a smart sound box B2, a tablet computer C2, and a desktop computer D2 belong to a same device network (an IoT network). At a moment, the mobile phone A2 is in a working state (a screen-on state), the smart sound box B2 is in a working state (playing music), the tablet computer C2 is in an online sleep state (a screen is turned off to save power, but the tablet computer C2 is not powered off), and the desktop computer D2 is powered off and goes offline. When a user needs to play music by using the mobile phone A2, because the mobile phone A2 may form a stereo network based on a loudspeaker of another online device in the IoT network to play music, the mobile phone A2 requests the user to choose whether to use the stereo network to play music. Before the mobile phone A2 requests the user to choose whether to use the stereo network to play music, the mobile phone A2 needs to determine an online device in the IoT network, to determine whether the stereo network can be constructed, and determine devices based on which the stereo network can be constructed.

In the foregoing application scenario, when the user needs to play music by using the mobile phone A2, the mobile phone A2 sends a BLE broadcast packet (a detection request packet) to a peripheral device (the smart sound box B2, the tablet computer C2, and the desktop computer D2) by using a BLE technology. The smart sound box B2 is in the working state, and may receive the detection request packet of the mobile phone A2 based on the BLE technology and feed back a detection response packet to the mobile phone A2. The desktop computer D2 is in a power-off offline state, and cannot receive a detection response packet of the mobile phone A2 and feed back a detection response packet to the mobile phone A2. The tablet computer C2 is in the online sleep state. In the sleep state, the tablet computer C2 may still enable the BLE. Therefore, the tablet computer C2 may also receive the detection request packet of the mobile phone A2 and feed back a detection response packet to the mobile phone A2. Finally, after releasing the detection request packet, the mobile phone A2 receives detection response packets of the smart sound box B2 and the tablet computer C2. Therefore, the mobile phone A2 determines that the online devices are the smart sound box B2 and the tablet computer C2, and the tablet computer C2 that sleeps online is not missed. After the mobile phone A2 determines that the online devices are the smart sound box B2 and the tablet computer C2, the mobile phone A2 requests the user to choose whether to use the stereo network to play music. In addition, the mobile phone A2 displays, to the user, that devices that can currently form the stereo network are the smart sound box B2 and the tablet computer C2.

Further, in the application scenario shown in FIG. 2, both the detection request packet released by the mobile phone A2 and detection response packets responded by the smart sound box B2 and the tablet computer C2 are BLE broadcast packets. Therefore, there is no need to establish Bluetooth persistent connections between the mobile phone A2 and the smart sound box B2 and between the mobile phone A2 and the tablet computer C2, and device air interface capabilities of the mobile phone A2, the smart sound box B2, and the tablet computer C2 are not occupied, and Bluetooth functions of the mobile phone A2, the smart sound box B2, and the tablet computer C2 will not be affected.

Further, in an actual application scenario, a same device may belong to a plurality of different device networks at the same time. Based on different application scenarios, when online device detection needs to be performed, targeted device networks are also different. To distinguish device networks for different application scenarios of online device detection, in an embodiment of this application, a detection request packet released by broadcast based on a BLE technology includes a network identifier of a device network on which online device detection is performed. The online device generates a corresponding detection response packet for the detection request packet only when receiving the detection request packet that includes a device identifier of a device network to which the online device belongs, and releases the detection response packet by broadcast.

Specifically, a network identifier of a device network is used to distinguish between different device networks, and network identifiers of different device networks are different. For example, the network identifier of the device network may be a unique device network name (for example, XXX private network) named by the user. For another example, the network identifier of the device network may be a unique network access interface address of the device network. For another example, the network identifier of the device network may be a unique network number allocated by a network management system when the device network is established.

Figure 3:
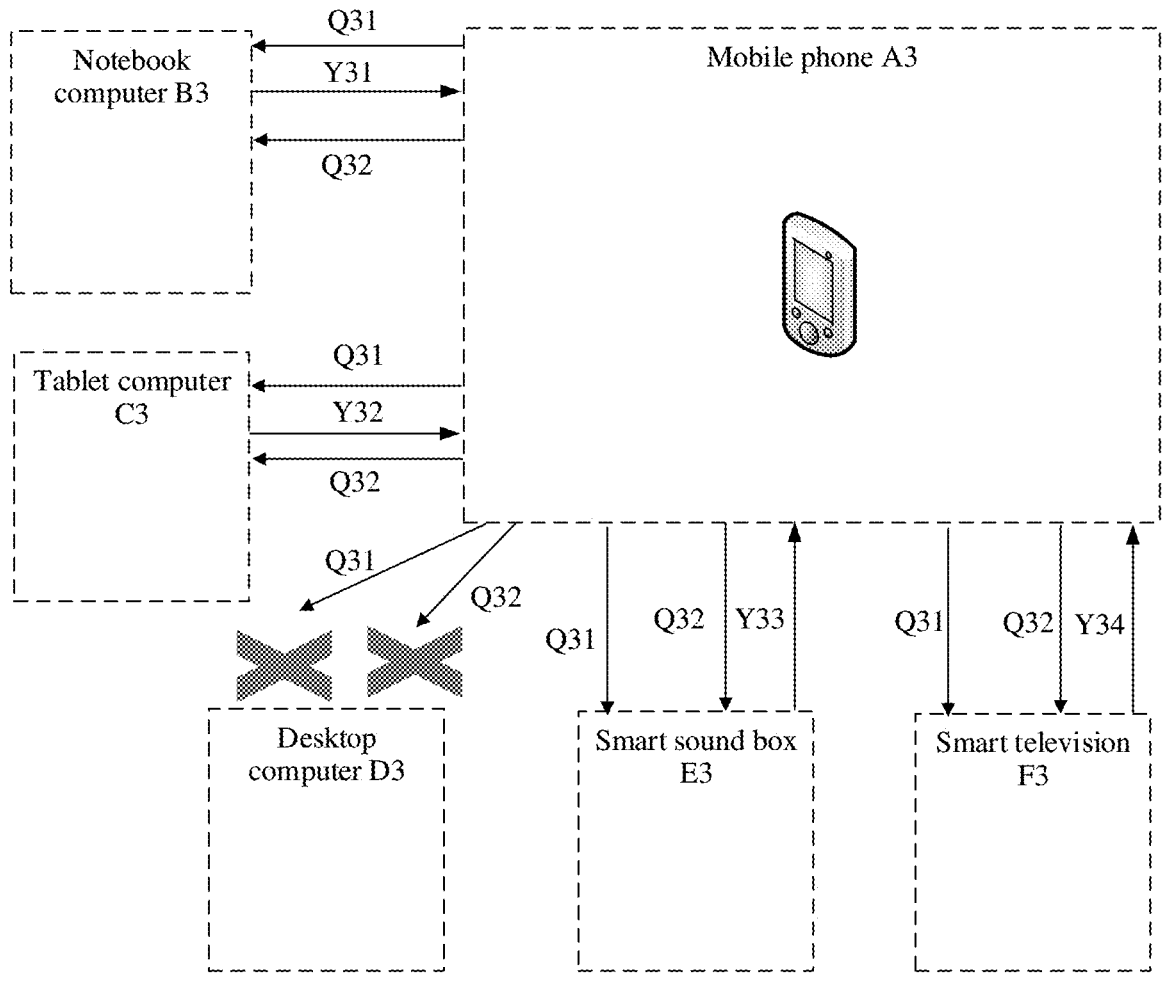
FIG. 3 is a schematic diagram of an application scenario according to an embodiment of this application.

As shown in FIG. 3, a mobile phone A3, a notebook computer B3, a tablet computer C3, and a desktop computer D3 all belong to a device network Z31 (a device network established by a user for personal office), and the mobile phone A3, a smart sound box E3, and a smart television F3 all belong to a device network Z32 (a device network of a smart household appliance of the user). It is assumed that, at a moment, the mobile phone A3 and the notebook computer B3 are in a working state (a screen-on state), the smart sound box E3 is in a working state (playing music), the tablet computer C3 and the smart television F3 are in an online sleep state, and the desktop computer D3 is powered off and goes offline.

In an application scenario, the user needs to send a document file on the mobile phone A3 to an online device in the device network Z31 by using the mobile phone A3 to implement data backup, and the mobile phone A3 needs to display online devices in the device network Z31 to the user for the user to choose a sending target of the document file. In this case, the mobile phone A3 needs to determine the online devices in the device network Z31.

For the foregoing application scenario, when the user chooses an external device backup option for the document file on the mobile phone A3, the mobile phone A3 sends, by using the BLE technology, a detection request packet Q31 that includes a network identifier of the device network Z31 to peripheral devices. The notebook computer B3 and the smart sound box E3 are in the working state, and may receive the detection request packet Q31 of the mobile phone A3 based on the BLE technology. Because B3 belongs to the device network Z31, the notebook computer B3 feeds back, to the mobile phone A3, a detection response packet Y31 that includes the network identifier of the device network Z31. Because E3 does not belong to the device network Z31, the smart sound box E3 does not feed back a detection response packet to the mobile phone A3. The desktop computer D3 is in a power-off offline state, and cannot receive the detection request packet Q31 of the mobile phone A3 and feed back a detection response packet to the mobile phone A3. The tablet computer C3 and the smart television F3 are in the online sleep state. In the sleep state, the tablet computer C3 and the smart television F3 may still enable the BLE. Therefore, the tablet computer C3 and the smart television F3 may also receive the detection request packet Q31 of the mobile phone A3. In addition, because C3 belongs to the device network Z31, the tablet computer C3 feeds back, to the mobile phone A3, a detection response packet Y32 that includes the network identifier of the device network Z31. Because F3 does not belong to the device network Z31, the smart television F3 does not feed back a detection response packet to the mobile phone A3.

Finally, after releasing the detection request packet, the mobile phone A3 receives detection response packets of the notebook computer B3 and the tablet computer C3. Therefore, the mobile phone A3 determines that the notebook computer B3 and the tablet computer C3 are online in the device network Z31. The mobile phone A3 displays, to the user, that external devices that can be currently used for backup are the notebook computer B3 and the tablet computer C3, and the user may choose to send the document file to the notebook computer B3 or the tablet computer C3 to implement document file backup.

In an application scenario, the user needs to control a smart household appliance at home by using the mobile phone A3. Before the user performs control, the mobile phone A3 needs to display, to the user, online smart household appliance devices in the device network Z32 for the user to choose a control object. Therefore, the mobile phone A3 needs to determine the online devices in the device network Z32.

The mobile phone A3 sends a detection request packet Q32 that includes a network identifier of the device network Z32 to peripheral devices by using the BLE technology. The notebook computer B3 and the smart sound box E3 are in the working state, and may receive the detection request packet Q32 of the mobile phone A3 based on the BLE technology. Because E3 belongs to the device network Z32, the smart sound box E3 feeds back, to the mobile phone A3, a detection response packet Y33 that includes the network identifier of the device network Z32. Because B3 does not belong to the device network Z32, the notebook computer B3 does not feed back a detection response packet to the mobile phone A3. The desktop computer D3 is in the power-off offline state, and cannot receive a detection response packet of the mobile phone A3 and feed back the detection request packet Q32 to the mobile phone A3. The tablet computer C3 and the smart television F3 are in the online sleep state. In the sleep state, the tablet computer C3 and the smart television F3 may still enable the BLE. Therefore, the tablet computer C3 and the smart television F3 may also receive the detection request packet Q32 of the mobile phone A3. In addition, because F3 belongs to the device network Z32, the smart television F3 feeds back, to the mobile phone A3, a detection response packet Y34 that includes the network identifier of the device network Z32. Because C3 does not belong to the device network Z32, the tablet computer C3 does not feed back a detection response packet to the mobile phone A3.

Finally, after releasing the detection request packet, the mobile phone A3 receives detection response packets of the smart television F3 and the smart sound box E3. Therefore, the mobile phone A3 determines that the smart sound box E3 and the smart television F3 are online in the device network Z32.

Specifically, an embodiment of this application provides a communication method, and the communication method is used to detect an online device. The method is performed by an online device detection initiator device. When a device needs to detect an online device (for example, when a mobile phone needs to determine an online device in the Internet of Things to display, to a user, a device that may be used to establish a stereo network, or when the mobile phone needs to determine an online device in the Internet of Things to display, to the user, a device that can receive backup data of a document file), the device is used as an online device detection initiator device, and performs the following steps shown in FIG. 4.

Step 410: Release a detection request packet by broadcast based on a Bluetooth low energy technology, where the detection request packet is a BLE broadcast packet, the detection request packet includes a network identifier of a device network on which online device detection is performed, and the network identifier in the detection request packet is used to enable a device receiving the detection request packet to determine whether the device network at which the detection request packet is targeted is a device network to which the device receiving the detection request packet belongs.

Step 420: Receive, based on the Bluetooth low energy technology, a detection response packet that is released by broadcast and that includes the network identifier of the device network on which online device detection is performed, where the detection response packet is a BLE broadcast packet, and the detection response packet is a response packet generated, based on the detection request packet after the detection request packet is received, by an online device in the device network on which online device detection is performed.

Step 430: Determine the online device in the device network based on the detection response packet.

After step 430, the device that serves as the online device detection initiator device may perform a subsequent operation based on a determined online device detection result. For example, the mobile phone displays, to the user, the device that may be used to establish the stereo network, or the mobile phone displays, to the user, the device that can receive the backup data of the document file.

In an embodiment of this application, when the device needs to perform online device detection, step 410 is initiated. For example, when an online device in a device network needs to be determined in a process of executing an application on the device, step 410 is initiated (for example, in a process of establishing a stereo network by a smart sound box, the smart sound box needs to display, to the user, online devices that may be used to establish the stereo network for the user to choose). For another example, the device is set to perform online device detection periodically to save and update an online device list on the device, so that the online device list can be directly invoked when the online device in the device network needs to be determined in the process of executing the application on the device. In this case, the device periodically initiates step 410. For another example, when the device unlocks a screen, the device initiates online device detection, to meet a requirement of timely updating whether another device is online by the device. For another example, at a specific time point, for example, when an alarm clock rings, the device initiates online device detection. For another example, when an event is triggered, for example, when the mobile phone receives a notification message, the mobile phone initiates online device detection to timely update an online status of another device.

Further, an embodiment of this application provides a communication method, and the communication method is used to feed back an online status. The method is performed by an online device in a device network of an online device detection initiator device. The online device in the device network performs the following steps shown in FIG. 5 to feed back the online status.

Step 510: Receive a broadcast packet based on a Bluetooth low energy technology, and when a detection request packet including a network identifier of a device network to which a current device belongs is received, generate, based on the detection request packet, a detection response packet including the network identifier, where the detection request packet is a BLE broadcast packet;
the detection response packet is a BLE broadcast packet; and
the network identifier included in the detection response packet is consistent with that in the detection request packet, and the network identifier in the detection request packet is used to enable a device that releases the detection request packet to determine whether the detection response packet corresponds to the detection request packet.

Step 520: Release the detection response packet by broadcast based on the Bluetooth low energy technology.

Further, based on the method in the embodiment shown in FIG. 4, an embodiment of this application further provides a communication apparatus. The apparatus is configured to detect an online device. The apparatus includes:

a packet broadcasting module, configured to release a detection request packet by broadcast based on a Bluetooth low energy technology, where the detection request packet is a BLE broadcast packet, the detection request packet includes a network identifier of a device network on which online device detection is performed, and the network identifier in the detection request packet is used to enable a device receiving the detection request packet to determine whether the device network at which the detection request packet is targeted is a device network to which the device receiving the detection request packet belongs;

a packet receiving module, configured to receive, based on the Bluetooth low energy technology, a detection response packet that is released by broadcast and that includes the network identifier, where the detection response packet is a BLE broadcast packet, and the detection response packet is a response packet generated, based on the detection request packet after the detection request packet is received, by an online device in the device network on which online device detection is performed; and an online status determining module, configured to determine the online device in the device network based on the detection response packet.

Further, based on the method in the embodiment shown in FIG. 5, an embodiment of this application further provides a communication apparatus. The apparatus is configured to feed back an online status. The apparatus includes:

a packet broadcasting module, configured to: receive a broadcast packet based on a Bluetooth low energy technology; when a detection request packet including a network identifier of a device network to which a current device belongs is received, generate, based on the detection request packet, a detection response packet including the network identifier; and release the detection response packet by broadcast based on the Bluetooth low energy technology, where the detection request packet is a BLE broadcast packet;
the detection response packet is a BLE broadcast packet; and
the network identifier included in the detection response packet is consistent with that in the detection request packet, and the network identifier in the detection request packet is used to enable a device that releases the detection request packet to determine whether the detection response packet corresponds to the detection request packet.

Further, based on the methods in embodiments shown in FIG. 4 and FIG. 5, an embodiment of this application further provides a communication method. The method is used to detect an online device. The detection method is performed by a device network, and includes the following steps.

When a device A16 in the device network has an online device detection requirement, the device A16 releases a detection request packet by broadcast based on a Bluetooth low energy technology. The detection request packet is a BLE broadcast packet. The detection request packet includes a network identifier of a device network on which online device detection is performed. The network identifier in the detection request packet is used to enable a device receiving the detection request packet to determine whether the device network at which the detection request packet is targeted is a device network to which the device receiving the detection request packet belongs.

An online device in the device network receives a broadcast packet based on the Bluetooth low energy technology. When an online device B000 in the device network receives the detection request packet, the device B16 generates, based on the detection request packet, a detection response packet including the network identifier, and releases the detection response packet by broadcast based on the Bluetooth low energy technology. The detection response packet is a BLE broadcast packet, and the network identifier included in the detection response packet is consistent with that in the detection request packet.

The device A16 receives a broadcast packet based on the Bluetooth low energy technology to obtain an online device detection result. When the device A16 receives the detection response packet released by the device B16, the device A16 determines that the device B16 is online.

Figure 6:
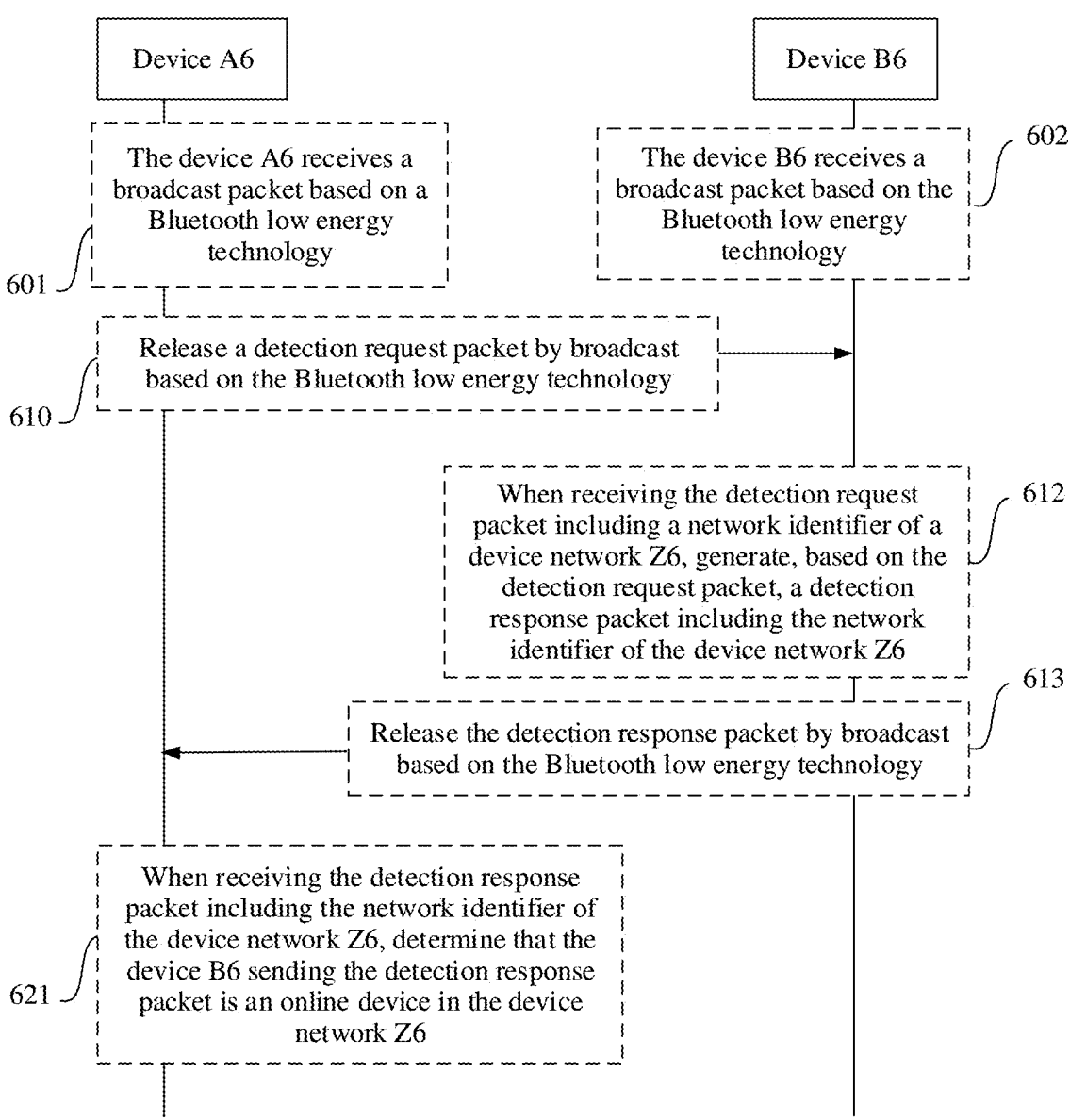
FIG. 6 is a sequence diagram of an application scenario according to an embodiment of this application.

A specific application scenario is used as an example. It is assumed that a device A6 and a device B6 are two online devices in a device network Z6. As shown in FIG. 6, in step 601, the device A6 receives a broadcast packet based on a Bluetooth low energy technology; and in step 602, the device B6 receives a broadcast packet based on the Bluetooth low energy technology.

When the device A6 needs to determine an online device in the device network Z6, the following steps are performed.

Step 610: The device A6 releases a detection request packet by broadcast based on the Bluetooth low energy technology, where the detection request packet is a BLE broadcast packet, and the detection request packet includes a network identifier of the device network Z6.

Step 612: When the device B6 receives the detection request packet including the network identifier of the device network Z6, the device B6 generates, based on the detection request packet, a detection response packet including the network identifier of the device network Z6.

Step 613: The device B6 releases the detection response packet by broadcast based on the Bluetooth low energy technology.

Step 621: When receiving the detection response packet including the network identifier of the device network Z6, the device A6 determines that the device B6 sending the detection response packet is an online device in the device network Z6.

According to the method in the embodiment of this application, all online devices including a sleeping device in a specified device network can be determined. According to the method in the embodiment of this application, it can be effectively avoided that an online sleeping device is missed when online device detection is performed, thereby greatly improving accuracy of an online device detection result. According to the method in the embodiment of this application, a Bluetooth air interface capability of a device is not occupied, so that a normal Bluetooth function of the device is not affected.

Further, an overall structure of the BLE broadcast packet is a preamble (preamble)+an access address (Access Address)+a protocol data unit (Protocol Data Unit, PDU)+ cyclic redundancy check (Cyclic Redundancy Check, CRC). The PDU part includes header information (Header Info)+a device address (AdvA)+a data field (AdvData).

According to a Bluetooth protocol, in broadcast data, the AdvData in the PDU includes one or more basic data structures (AD Structure). If a sum of all AD structures in the AdvData is less than 31 octets, the remaining part is padded with 000 . . . 000b. The padded part is referred to as a non-significant part.

A basic format of the AD structure is a data length (Length)+a data type (AD TYPE)+data content (AD Data). In an embodiment of this application, a data field (AdvData) in AD structure data of the BLE broadcast packet is used to carry a network identifier.

Specifically, a data type of an AD structure of the BLE broadcast packet is set to a user-defined type, and the network identifier is written into data content of the AD structure.

For example, as shown in Table 1, a segment of AD structure data includes at least the following content:

TABLE 1

| | Length | AD TYPE | | AD data | |
| --- | --- | --- | --- | --- | --- |
| AD structure | XXXX | 0x16 | PktType | NetWorkId | |

In Table 1, an AD TYPE field of the AD structure is set to 0x16, and a network identifier (NetWorkId) and a packet type (Pkttype) are written into the AD data field of the AD structure. The Pkttype is used to distinguish whether the packet is a request packet or a response packet.

It should be noted herein that in an actual application scenario, based on an actual application requirement, content other than the Pkttype and the NetWorkId may also be written into the AD data field. For example, in some application scenarios, to facilitate networking construction between devices and establish a communication link between different devices, a universally unique identifier (Universally Unique Identifier, UUID) of the device is written into the AD data field.

Further, in the BLE broadcast packet, the device address (AdvA) includes a plurality of types, and some types of device addresses (AdvA) may be used to identify a device identity. To be specific, in an implementation of step 621, the device A6 identifies an identity of the device B6 based on a device address (AdvA) in the detection response packet, to determine that the device B6 sending the detection response packet is an online device in the device network Z6.

Specifically, in the BLE broadcast packet, a type of the device address (AdvA) includes a public device address (Public Device Address). The public device address includes a 24-bit company identifier (Company_id) and a 24-bit company assigned code (Company_assigned_). For a single device, the public device address is unique and unchanged, and may be directly used to identify a device identity without being interpreted.

The public device address may be used to directly identify the device identity. Therefore, in an implementation of step 612, the device address (AdvA) in the detection response packet generated by the device B6 is the public device address. Correspondingly, the device A6 stores a mapping relationship between a device in the device network and a public device address of the device. In step 621, the device A6 identifies the identity of the device B6 based on the device address (Public Device Address) in the detection response packet, to determine that the device B6 sending the detection response packet is an online device in the device network Z6.

Further, the device A6 may alternatively not store the mapping relationship between a device in the device network and a public device address of the device. In this case, in step 621, the device A6 can only determine that one online device exists in the device network, but cannot obtain a device description of the online device.

Further, in the BLE broadcast packet, the type of the device address (AdvA) further includes a random device address (Random Device Address). Different from the public device address, the random device address is not fixedly assigned but is randomly generated after the device is started. In other words, for different devices, random device addresses of the devices are different; and for a single device, a random device address is variable. Based on the random device address, the device identity cannot be directly identified.

Based on different purposes, random device addresses in BLE broadcast packets are classified into a static address (Static Device Address) and a private address (Private Device Address).

The static device address is randomly generated when the device is powered on and remains unchanged in a power-on cycle. The static device address may be changed when the device is powered on next time. However, this is not mandatory, and therefore, the static device address may remain unchanged. If the static device address is changed, information such as a connection saved last time is invalid.

In an application scenario, when a device is powered on and generates a static device address, the static device address may be synchronized to another device in a device network in which the device is located, so as to store a correspondence between the static device address and the device in the another device. In this way, during a current power-on period of the device, a device identity can be identified by using the static device address.

Therefore, in an implementation of step 612, the device address (AdvA) in the detection response packet generated by the device B6 is a static device address, where a mapping relationship between the static device address of the device B6 and the device B6 is stored in the device A6. In step 621, the device A6 identifies the identity of the device B6 based on the device address (Static Device Address) in the detection response packet, to determine that the device B6 sending the detection response packet is an online device in the device network Z6.

A definition of the private device address of the BLE broadcast packet contains two subclasses: a non-resolvable private address (Non-resolvable Private Address) and a resolvable private address (Resolvable Private Address).

The resolvable private address is generated by using a random number and an identity resolving key (Identity Resolving Key, IRK). Therefore, the resolvable private address can be resolved only by a device with the same IRK, thereby preventing the resolvable private address from being scanned and tracked by an unknown device.

Therefore, in an implementation of step 612, the device address (AdvA) in the detection response packet generated by the device B6 is a resolvable private address, where an IPK of the resolvable private address of the device B6 is already stored in the device A6. In step 621, the device A6 identifies the identity of the device B6 based on the device address (Resolvable Private Address) in the detection response packet, to determine that the device B6 sending the detection response packet is an online device in the device network Z6.

The non-resolvable private address is address data that changes periodically. The non-resolvable private address cannot be resolved by another device and may be considered as a random number. The non-resolvable private address may protect user privacy because the constantly changing non-resolvable private address makes it impossible for any device to track a user by recording an address of a Bluetooth device. However, such a protection manner also means that a trusted device cannot identify a real identity of the Bluetooth device. In other words, if the device address (AdvA) in the detection response packet generated by the device B6 is a non-resolvable private address, the device A6 cannot identify the identity of the device B6 based on the device address in the detection response packet.

Further, in an actual application scenario, in addition to the non-resolvable private address type, a case in which a device address (AdvA) of another type cannot be resolved also exists. For example, for the static device address, when the mapping relationship between the static device address of the device B6 and the device B6 is not stored in A6, the device A6 cannot resolve the static device address of the device B6 to identify the identity of the device B6. For another example, for the resolvable private address, when the IPK of the resolvable private address of the device B6 is not stored in A6, the device A6 cannot resolve the resolvable private address of the device B6 to identify the identity of the device B6.

For a problem that the device A6 cannot identify the identity of the device B6 based on the device address (AdvA) in the detection response packet, in an implementation of step 612, the detection response packet generated by the device B6 carries a device identifier of the device B6, where the device identifier may be used to identify the identity of the device B6. In step 621, the device A6 identifies the identity of the device B6 based on the device identifier in an AD data field in the detection response packet, to determine that the device B6 sending the detection response packet is an online device in the device network Z6.

Specifically, in an embodiment of this application, a device identifier (DeviceId) of a detection response packet sending device is written into an AD data field of AD structure data in a detection response packet.

For example, as shown in Table 2, AD structure data in the detection response packet generated by the device B6 includes at least the following content:

TABLE 2

| | Length | AD TYPE | AD data | | |
|---|---|---|---|---|---|
| AD structure | XXXX | 0x16 | PktType | NetWorkId | DeviceId |

In Table 2, the AD TYPE field of the AD structure is set to 0x16, and the following is written into the AD data field of the AD structure: a network identifier (NetWorkId), a packet type (Pkttype), and the device identifier (DeviceId) of the device B6.

Further, in an actual application scenario, any data that may be bound to a device and that is unique in a device network may be selected as a device identifier according to an actual requirement.

For example, a unique number is preset for a device in a device network, and the unique number of the device is used as a device identifier of the device. It is assumed that five devices (A, B, C, D, and E) exist in a device network. That is, numbers 1 to 5 may be assigned to the five devices. In this device network, a device numbered 1 is a device A.

For another example, a public device address (Public Device Address) of a device may be directly used as a device identifier of the device.

For another example, a hash value of a public device address (Public Device Address) may be used as a device identifier of a device.

Further, in an actual application scenario, in a device network, a plurality of devices may initiate online device detection at the same time or at a short interval. In this case, a single online device receives a plurality of detection request packets, and the online device generates a plurality of detection response packets for the plurality of received detection request packets, and finally, the single device initiating online device detection receives a plurality of detection response packets from a same online device. However, the plurality of detection response packets from the same online device easily cause a determining logic disorder when the device initiating online device detection determines whether the device is online. For example, in some application scenarios, if the same online device is repeatedly determined to be online for a plurality of times, the device initiating online device detection generates a determining result indicating that a plurality of same online devices exist (a correct determining result is that the plurality of same online devices are the same device).

For example, devices A8, B8, and C8 belong to a same device network. When both the device A8 and the device B8 need to determine an online device, the device A8 releases a detection request packet Q81 by broadcast, and the device B8 releases a detection request packet Q82 by broadcast.

When receiving the detection request packet Q81, the online device C8 generates a detection response packet Y81 and releases the detection response packet Y81 by broadcast. When receiving the detection request packet Q82, the online device C8 generates a detection response packet Y82 and releases the detection response packet Y82 by broadcast. In this case, the device A8 and the device B8 receive detection response packets Y81 and Y82 that both point to the device C8.

When the device A8 determines the online device based on the detection response packets Y81 and Y82, the device A8 may generate an online device detection result: Two online devices (C8 that releases the detection response packet Y81 and C8 that releases the detection response packet Y82) exist. The device C8 is identified as two devices.

For the foregoing situation, a feasible solution is as follows: When a device initiating online device detection receives a plurality of detection response packets from a same device, only one detection response packet is recorded as a valid packet (for example, for an online device, a first detection response packet from the online device is recorded as a valid packet in a receiving time order), and it is determined that the corresponding device is online based on the valid detection response packet.

For example, assuming that the device A8 first receives the detection response packet Y81 from the device C8, the device A8 marks the detection response packet Y81 as a valid packet, and determines that the device C8 is an online device based on the detection response packet Y81. When the detection response packet Y82 from the device C8 is subsequently received, because the detection response packet Y81 has been marked as a valid packet for the device C8, the device A8 does not perform further data processing on the detection response packet Y82. In this way, repeated online device determining on the device C8 is effectively avoided.

Although the foregoing solution avoids determining confusion when determining an online device, an initiating device for online device detection still receives a plurality of detection response packets from a same online device, and the initiating device for online device detection further needs to identify a valid packet, so a determining process is greatly complicated.

Therefore, in an embodiment of this application, a detection response packet carries a packet identifier, and the packet identifier is used to mark a detection request packet sending device corresponding to the detection response packet to which the packet identifier belongs, so that the detection request packet sending device that receives the detection response packet determines whether the detection response packet is used to respond to a detection request packet sent by the detection request packet sending device. In this way, the detection request packet sending device determines an online device only based on a detection response packet for the detection request packet sending device, thereby effectively avoiding that the detection request packet sending device performs online device determining on a same online device for a plurality of times.

For example, devices A9, B9, and C9 belong to a same device network. When both the device A9 and the device B9 need to determine an online device, the device A9 releases a detection request packet Q91 by broadcast, and the device B9 releases a detection request packet Q92 by broadcast.

When receiving the detection request packet Q91, the online device C9 generates a detection response packet Y91 including a packet identifier W91, where the packet identifier W91 corresponds to the detection request packet Q91. When receiving the detection request packet Q92, the online device C9 generates a detection response packet Y92 including a packet identifier W92, where the packet identifier W92 corresponds to the detection request packet Q92.

When receiving detection response packets released by broadcast, the device A9 and the device B9 may determine, based on whether the detection response packets include packet identifiers corresponding to detection request packets sent by the device A9 and the device B9, whether the detection response packets respond to the detection request packets released by the device A9 and the device B9.

For example, when the device A9 receives the detection response packet Y91, the detection response packet Y91 includes the packet identifier W91, and the packet identifier W91 corresponds to the detection request packet Q91 sent by the device A9. Therefore, the device A9 determines that the detection response packet Y91 is a detection response packet for the device A9. When the device A9 receives the detection response packet Y92, the detection response packet Y92 includes the packet identifier W92, and the packet identifier W92 does not correspond to the detection request packet Q91 sent by the device A9. Therefore, the device A9 determines that the detection response packet Y92 is not a detection response packet for the device A9.

Further, in an actual application scenario, any data that can distinguish between different detection request packet sending devices may be used as a packet identifier.

For example, a unique number is preset for a device in a device network, and the unique number of the device is used as a packet identifier corresponding to the device. It is assumed that five devices (A, B, C, D, and E) exist in a device network. That is, numbers 1 to 5 may be assigned to the five devices. In the device network, a packet identifier number 1 corresponds to a device A.

For another example, a device identifier of a device may be directly used as a packet identifier corresponding to the device.

For another example, a public device address (Public Device Address) of the device may be directly used as the packet identifier corresponding to the device. Alternatively, a hash value of the public device address (Public Device Address) is used as the packet identifier corresponding to the device.

Specifically, in an embodiment of this application, a device identifier of a sending device for a detection request packet is used as a packet identifier corresponding to the detection request packet. That is, when receiving the detection request packet Q91, the online device C9 generates the detection response packet Y91 that includes a device identifier of the device A9. When receiving the detection request packet Q92, the online device C9 generates the detection response packet Y92 that includes a device identifier of the device B9. When receiving the detection response packets released by broadcast, the device A9 and the device B9 may determine, based on whether the detection response packets include device identifiers of the device A9 and the device B9, whether the detection response packets respond to the detection request packets released by the device A9 and the device B9.

Specifically, a single device in the device network stores a mapping relationship between a device identifier and a device address of another device in the network. A sending device for a detection response packet resolves a device address (AdvA) in a detection request packet to identify a sending device of the detection request packet, and determines a device identifier of the sending device of the detection request packet based on a stored mapping relationship between the device identifier and the device address, so as to write the device identifier of the sending device of the detection request packet into the AD data field of the detection response packet.

Further, regardless of whether the device address (AdvA) of the detection request packet can be used to identify an identity of the detection request packet sending device (regardless of whether the device address (AdvA) of the detection request packet is a public device address or a random device address), the detection request packet sending device may determine whether a device address (AdvA) is a device address (AdvA) of the detection request packet sending device. Therefore, in an embodiment of this application, the device address (AdvA) of the detection request packet is used as a packet identifier corresponding to the detection request packet. The sending device of the detection response packet writes the device address (AdvA) of the detection request packet into the detection response packet. After receiving the detection response packet, the detection request packet sending device may determine whether the detection response packet is a detection response packet for the detection request packet sending device based on whether the device address carried in the detection response packet and used as the packet identifier is a device address of the detection request packet sending device.

For example, when receiving the detection request packet Q91, the online device C9 generates the detection response packet Y91 including the packet identifier W91, where the packet identifier W91 is a device address (AdvA) of the detection request packet Q91 (a device address of the device A9). When receiving the detection request packet Q92, the online device C9 generates the detection response packet Y92 including the packet identifier W92, where the packet identifier W92 is a device address (AdvA) of the detection request packet Q92 (a device address of the device B9).

When receiving the detection response packets released by broadcast, the device A9 and the device B9 may determine, based on whether the detection response packets include device addresses of the device A9 and the device B9, whether the detection response packets respond to the detection request packets released by the device A9 and the device B9.

Further, in an embodiment of this application, a detection request packet carries a packet identifier of the detection request packet. After receiving the detection request packet, an online device writes the packet identifier carried in the detection request packet into a detection response packet in a process of generating the detection response packet.

Specifically, in an embodiment of this application, in step 410, the detection request packet includes a packet identifier, where the packet identifier is used to distinguish between different detection request packet sending devices; and in step 420, a detection response packet that is released by broadcast and that includes a network identifier of a device network on which online device detection is performed and a packet identifier corresponding to a current device is received based on a Bluetooth low energy technology.

Correspondingly, in an embodiment of this application, in step 510, the detection request packet includes a packet identifier of a device that releases the detection request packet. Generating, based on the detection request packet, a detection response packet including a network identifier includes: generating, based on the detection request packet, the detection response packet including the network identifier and the packet identifier.

The packet identifier included in the detection response packet is consistent with that in the detection request packet.

Specifically, in an embodiment of this application, a packet identifier is written into an AD data field of AD structure data in a detection response packet.

The embodiment shown in FIG. 6 is used as an example. As shown in Table 3, the device identifier of the device A6 is used as a packet identifier of the device A6. The AD structure data in the detection response packet generated by the device B6 includes the following content:

TABLE 3

| | Length | AD TYPE | AD data | | | |
|---|---|---|---|---|---|---|
| AD structure | XXXX | 0x16 | PktType | NetWorkId | De-viceId1 | De-viceId2 |

In Table 3, the AD TYPE field of the AD structure is set to 0x16, and the following is written into the AD data field of the AD structure: a network identifier (NetWorkId), a packet type (Pkttype), a device identifier of the device B6 (DeviceId1), and a device identifier of the device A6 (DeviceId2).

It should be noted herein that content of the AD data field in Table 3 does not represent an arrangement manner of parameters in the AD data in an actual application scenario. A person skilled in the art may set the arrangement manner of the parameters in the AD data according to a requirement of an application scenario of the person skilled in the art.

Further, to reduce a data processing amount as much as possible, in an embodiment of this application, a broadcast packet is received in a data filtering mode, to obtain a valid detection request packet and/or a valid detection response packet.

Specifically, in an implementation of step 420:

a Bluetooth low energy packet is received based on a preset first filter condition to receive a detection response packet, where the first filter condition includes:

the detection response packet is a BLE broadcast packet; and the detection response packet includes a device identifier of a current device; and the detection response packet includes a network identifier of a device network on which online device detection is performed.

Specifically, in an implementation of step 510:

a Bluetooth low energy packet is received based on a preset second filter condition to receive a detection request packet, where the second filter condition includes:

the detection request packet is a BLE broadcast packet; and a detection response packet includes a network identifier of a device network to which a current device belongs.

For example, it is assumed that a device A10 and a device B10 are two online devices in a device network Z10. As shown in FIG. 7, when the device A10 needs to determine an online device in the device network Z10, the following steps are performed.

Step 710: Set a broadcast packet filtering rule of the device A10 as: a BLE broadcast packet+a device identifier of the device A10+a network identifier of the device network Z10.

Step 720: Set a broadcast packet filtering rule of the device B10 as: a BLE broadcast packet+a network identifier of the device network to which the device B10 belongs.

Step 721: The device B10 receives a broadcast packet based on a Bluetooth low energy technology according to the broadcast packet filtering rule specified in step 720.

Step 711: The device A10 releases a detection request packet by broadcast based on the Bluetooth low energy technology, where the detection request packet is a BLE broadcast packet, and the detection request packet includes the network identifier of the device network Z10 and the device identifier of the device A10.

Because the detection request packet released by broadcast by the device A10 is the BLE broadcast packet, and the detection request packet released by broadcast by the device A10 includes the network identifier of the device network Z10, which meets the broadcast packet filtering rule specified in step 702, the device B10 may receive the detection request packet released by broadcast by the device A10.

Step 722: When receiving the detection request packet released by broadcast by the device A10, the device B10 generates a detection response packet based on the detection request packet, where the network identifier and the device identifier in the detection request packet are written into the detection response packet.

Step 723: The device B10 releases the detection response packet by broadcast based on the Bluetooth low energy technology.

Step 712: The device A10 receives a broadcast packet based on the Bluetooth low energy technology according to the broadcast packet filtering rule specified in step 710.

Because the detection response packet released by broadcast by the device B10 is a BLE broadcast packet, and the detection request packet released by broadcast by the device B10 includes the network identifier of the device network Z10 and the device identifier of the device A10, which meets the broadcast packet filtering rule specified in step 710, the device A10 may receive the detection response packet released by broadcast by the device B10.

Step 713: The device A10 determines, based on the received detection response packet from the device B10, that the device B10 is an online device.

Taking a specific application scenario as an example, devices A11, B11, and C11 belong to a same device network. When both the device A11 and the device B11 need to determine an online device, the device A11 releases a detection request packet Q111 by broadcast, and the device B11 releases a detection request packet Q112 by broadcast.

When receiving the detection request packet Q112, the online device A11 generates a detection response packet Y111 that includes a device identifier of the device B11.

When receiving the detection request packet Q111, the online device B11 generates a detection response packet Y112 that includes a device identifier of the device A11.

When receiving the detection request packet Q111, the online device C11 generates a detection response packet Y113 that includes the device identifier of the device A11. When receiving the detection request packet Q112, the online device C11 generates a detection response packet Y114 that includes the device identifier of the device B11.

Detection response packets Y111, Y112, Y113, and Y114 are all released by broadcast.

Detection response packets Y112, Y113, and Y114 are sent to the device A11. The detection response packet Y114 includes the device identifier of the device B11, and therefore is filtered out. Detection response packets Y112 and Y113 include the device identifier of the device A11, and therefore are received by the device A11.

Detection response packets Y111, Y113, and Y114 are sent to the device B11. The detection response packet Y113 includes the device identifier of the device A11, and therefore is filtered out. Detection response packets Y111 and Y114 include the device identifier of the device B11, and therefore are received by the device B11.

Further, in an embodiment of this application, when a device needs to determine an online device, the method for detecting an online device provided in embodiments of this application is performed. In another embodiment of this application, the method for detecting an online device provided in this embodiment of this application is performed in advance to determine an online device. When a device needs to determine an online device, a determined online device determining result is invoked. In this way, a waiting time period can be greatly shortened when the device needs to determine the online device, thereby improving user experience.

Further, because a status of an online device in a device network keeps changing, in an embodiment of this application, step 410 to step 430 are periodically performed at a preset time interval (for example, step 410 to step 430 are performed every two minutes), to continuously update the status of the online device in the device network. When the device needs to determine an online device, an online device detection result obtained in the latest execution of step 410 to step 430 is invoked. In this way, a waiting time period is greatly shortened when the device needs to determine an online device, thereby improving user experience.

Figure 8:
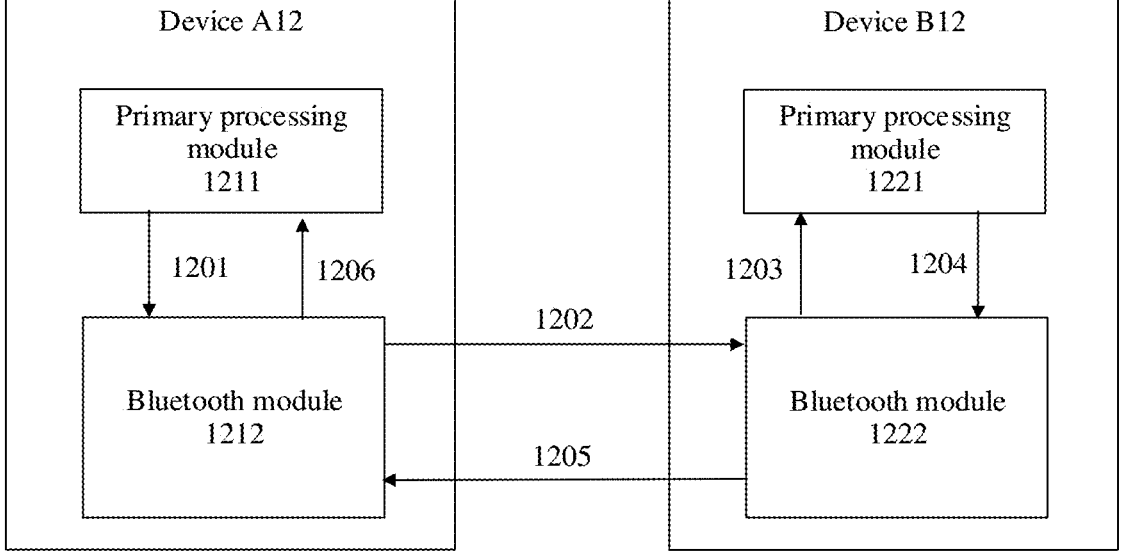
FIG. 8 is a schematic diagram of a functional structure of a device according to an embodiment of this application.

Further, in an application scenario according to an embodiment of this application, as shown in FIG. 8, a device A12 and a device B12 are two online devices in a device network Z12. When the device A12 needs to determine an online device in the device network Z12, a primary processing module 1211 (for example, a central processing unit (Central Processing Unit, CPU)) of the device A12 generates a detection request packet. The primary processing module 1211 sends the detection request packet to a Bluetooth module 1212 (an arrow 1201). The Bluetooth module 1212 releases the detection request packet by broadcast based on a Bluetooth low energy technology (an arrow 1202).

A Bluetooth module 1222 of the device B12 receives a broadcast packet based on a preset filtering rule based on the Bluetooth low energy technology. After the Bluetooth module 1222 receives the detection request packet, the Bluetooth module 1222 sends the detection request packet to the primary processing module 1221 of the device B12 (an arrow 1203). The primary processing module 1221 generates a detection response packet. The primary processing module 1221 sends the detection response packet to the Bluetooth module 1222 (an arrow 1204). The Bluetooth module 1222 releases the detection response packet by broadcast based on the Bluetooth low energy technology (an arrow 1205).

The Bluetooth module 1212 of the device A12 receives a broadcast packet based on a preset filtering rule based on the Bluetooth low energy technology. After the Bluetooth module 1212 receives the detection response packet, the Bluetooth module 1212 sends the detection response packet to the primary processing module 1211 (an arrow 1206). The primary processing module 1211 determines the online device based on the received response packet.

In the application scenario shown in FIG. 8, the Bluetooth module 1222 of the device B12 receives/releases a broadcast packet based on the Bluetooth low energy technology.

Therefore, even if the device B12 is in a sleep state, the device B12 may still receive a detection request packet and release a detection response packet. However, after receiving the detection request packet, the Bluetooth module 1222 needs to send the detection request packet to the primary processing module 1221, and the primary processing module 1221 generates a detection response packet. If the device B12 receives the detection request packet in the sleep state, the device B12 needs to be woken up (the primary processing module is started), so as to generate the detection response packet, which inevitably increases power consumption of the device B12.

For the foregoing problem, in an embodiment of this application, to avoid waking up an online device in a sleep state, a detection response packet is generated based on a function module that can be enabled in a sleep state (step 520 is performed).

Figure 9:
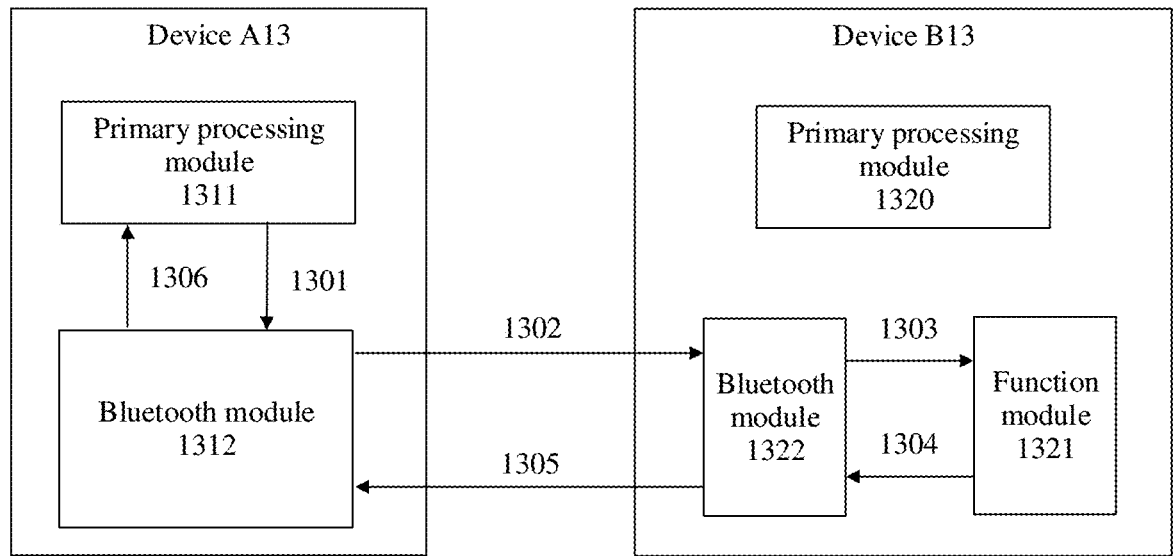
FIG. 9 is a schematic diagram of a functional structure of a device according to an embodiment of this application.

Specifically, in an application scenario according to an embodiment of this application, as shown in FIG. 9, a device A13 and a device B13 are two online devices in a device network Z13. When the device A13 needs to determine an online device in the device network Z13, a primary processing module 1311 of the device A13 generates a detection request packet. The primary processing module 1311 sends the detection request packet to a Bluetooth module 1312 (an arrow 1301). The Bluetooth module 1312 releases the detection request packet by broadcast based on a Bluetooth low energy technology (an arrow 1302).

A Bluetooth module 1322 of the device B13 receives a broadcast packet based on a preset filtering rule based on the Bluetooth low energy technology. After the Bluetooth module 1322 receives the detection request packet, the Bluetooth module 1322 sends the detection request packet to a function module 1321 (an arrow 1303). The function module 1321 generates a detection response packet. The function module 1321 sends the detection response packet to the Bluetooth module 1222 (an arrow 1304). The Bluetooth module 1222 releases the detection response packet by broadcast based on the Bluetooth low energy technology (an arrow 1305).

The Bluetooth module 1312 of the device A13 receives a broadcast packet based on a preset filtering rule based on the Bluetooth low energy technology. After the Bluetooth module 1312 receives the detection response packet, the Bluetooth module 1312 sends the detection response packet to the primary processing module 1311 (an arrow 1306). The primary processing module 1311 determines an online device based on the received response packet.

In the application scenario shown in FIG. 9, the Bluetooth module 1322 of the device B13 receives a broadcast packet based on the Bluetooth low energy technology. Therefore, even if the device B13 is in a sleep state, the device B13 may still receive a detection request packet.

Further, the function module 1321 of the device B13 is a function module that can be enabled in a sleep state, for example, a system-on-a-chip (System-on-a-Chip, SOC), a microcontroller unit (Microcontroller Unit, MCU), or the like (for example, a sensor hub (Sensor Hub) with low power consumption) that may be enabled in a sleep state. The process of generating and releasing, by broadcast, the detection response packet does not require participation of the primary processing module 1320 of the device B13. Therefore, even if the device B13 is in a sleep state, the device B13 may generate and release a detection response packet without being woken up.

Further, in the application scenario shown in FIG. 8, the Bluetooth module 1212 of the device A12 receives/releases a broadcast packet based on the Bluetooth low energy technology. Therefore, even if the device A12 is in a sleep state, the device A12 may still release a detection request packet and receive a detection response packet. However, the detection request packet released by the device A12 is generated by the primary processing module 1211, and after the Bluetooth module 1212 receives the detection response packet, the primary processing module 1211 needs to determine an online device based on the received response packet. In this way, an online device detection operation can be performed only when the device A12 is in a non-sleep state. Further, in an application solution in which an online device detection operation is performed periodically to pre-determine a status of an online device, a device needs to be woken up periodically from a sleep state to perform the online device detection operation. This greatly increases power consumption of the device.

For the foregoing problem, in an embodiment of this application, to avoid waking up an online device in a sleep state, step 410 to step 430 are performed based on a function module that can be enabled in a sleep state.

Figure 10:
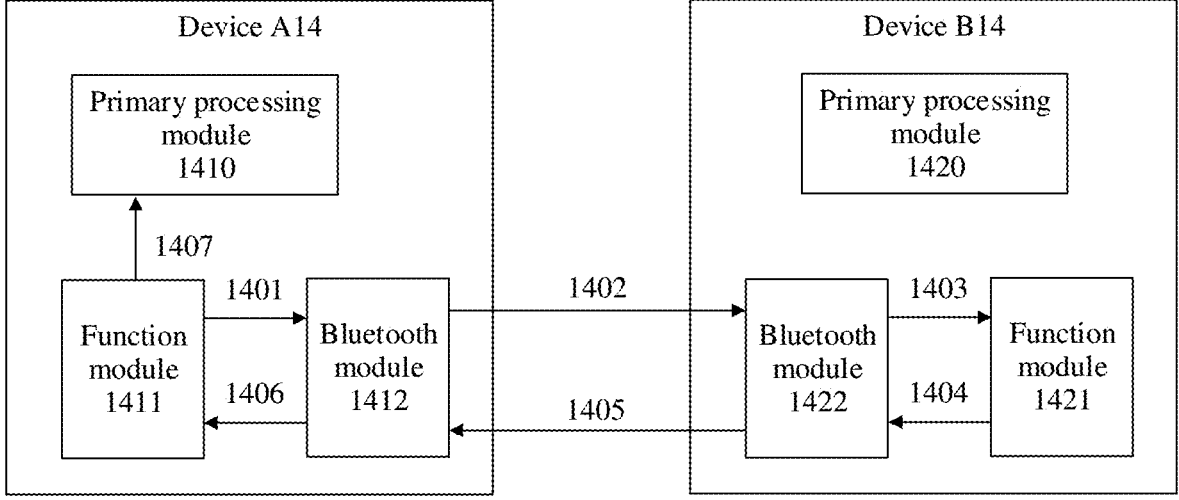
FIG. 10 is a schematic diagram of a functional structure of a device according to an embodiment of this application.

Specifically, in an application scenario according to an embodiment of this application, as shown in FIG. 10, a device A14 and a device B14 are two online devices in a device network Z14. When the device A14 needs to determine an online device in the device network Z14, a function module 1411 of the device A14 generates a detection request packet. The function module 1411 sends the detection request packet to a Bluetooth module 1412 (an arrow 1401). The Bluetooth module 1412 releases the detection request packet by broadcast based on a Bluetooth low energy technology (an arrow 1402).

A Bluetooth module 1422 of the device B14 receives a broadcast packet based on a preset filtering rule based on the Bluetooth low energy technology. After the Bluetooth module 1422 receives the detection request packet, the Bluetooth module 1422 sends the detection request packet to a function module 1421 (an arrow 1403). The function module 1421 generates a detection response packet. The function module 1421 sends the detection response packet to the Bluetooth module 1422 (an arrow 1404). The Bluetooth module 1422 releases the detection response packet by broadcast based on the Bluetooth low energy technology (an arrow 1405).

The Bluetooth module 1412 of the device A14 receives a broadcast packet based on a preset filtering rule based on the Bluetooth low energy technology. After the Bluetooth module 1412 receives the detection response packet, the Bluetooth module 1412 sends the detection response packet to the function module 1411 (an arrow 1406). The function module 1411 determines an online device based on the received response packet.

In the application scenario shown in FIG. 10, the Bluetooth module 1422 of the device B14 receives/releases a broadcast packet based on the Bluetooth low energy technology. Therefore, even if the device B14 is in a sleep state, the device B14 may still receive a detection request packet and release a detection response packet.

Further, the function module 1421 of the device B14 is a function module that can be enabled in a sleep state, for example, a system-on-a-chip (System-on-a-Chip, SOC), a microcontroller unit (Microcontroller Unit, MCU), or the like (for example, a sensor hub (Sensor Hub) with low power consumption) that may be enabled in a sleep state. The process of generating and releasing, by broadcast, the detection response packet does not require participation of a primary processing module 1420 of the device B14. Therefore, even if the device B14 is in a sleep state, the device B14 may generate and release a detection response packet without being woken up.

Further, the Bluetooth module 1412 of the device A14 releases/receives a broadcast packet based on the Bluetooth low energy technology. Therefore, even if the device A14 is in a sleep state, the device A14 may still receive a detection response packet.

Further, the function module 1411 of the device A14 is a function module that can be enabled in a sleep state, for example, a system-on-a-chip (System-on-a-Chip, SOC), a microcontroller unit (Microcontroller Unit, MCU), or the like (for example, a sensor hub (Sensor Hub) with low power consumption) that may be enabled in a sleep state. The process of generating the detection request packet and the process of determining an online device based on the detection request packet do not require participation of a primary processing module 1410 of the device A14. Therefore, even if the device A14 is in a sleep state, online device detection can be performed without waking up the device A14. After the online device detection is completed, if the device A14 is woken up and needs to determine a status of the online device, only a determining result of the function module 1411 needs to be directly invoked (an arrow 1407).

Further, the foregoing method for detecting an online device may be summarized as an active detection method actively initiated by a device that needs to detect an online device. In an embodiment of this application, a passive detection method is provided. Specifically, an online device in a device network actively releases an online packet by broadcast. When receiving the online packet, a device may determine that the releasing device of the online packet is an online device.

Specifically, in an embodiment of this application, a method for detecting an online device includes:

receiving, based on a Bluetooth low energy technology, an online packet that is released by broadcast and that includes a network identifier of a device network to which a current device belongs, where the online packet is a BLE broadcast packet, and the online packet is a packet that is released periodically at a preset second time interval by an online device in the device network to which the current device belongs; and determining, based on the online packet, the online device in the device network to which the current device belongs.

Specifically, in an embodiment of this application, a method for feeding back an online status includes:

periodically releasing an online packet by broadcast based on a Bluetooth low energy technology at a preset time interval, where the online packet is a BLE broadcast packet; and the online packet includes a network identifier of a device network to which a current device belongs.

Figure 11:
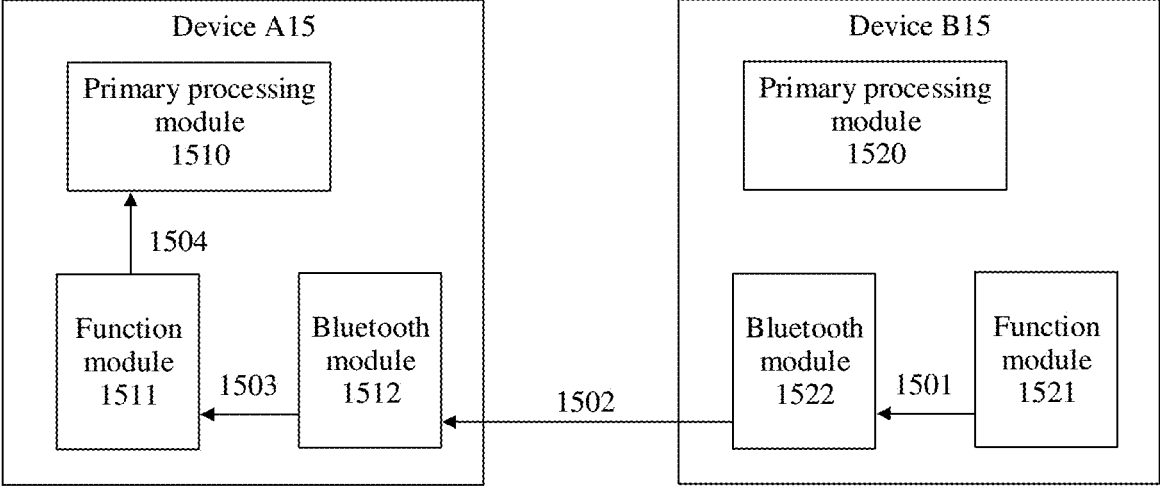
FIG. 11 is a schematic diagram of a functional structure of a device according to an embodiment of this application.

Specifically, in an application scenario according to an embodiment of this application, as shown in FIG. 11, a device A15 and a device B15 are two online devices in a device network Z15.

A function module 1521 of the device B15 periodically generates an online packet (for example, once every two minutes) at a preset time interval. The online packet includes a network identifier of a device network to which the device B15 belongs.

The function module 1521 sends the online packet to a Bluetooth module 1522 (an arrow 1501). The Bluetooth module 1522 periodically releases the online packet by broadcast based on a Bluetooth low energy technology (an arrow 1502) (for example, once every two minutes).

A Bluetooth module 1512 of the device A15 receives the online packet based on the Bluetooth low energy technology. When the Bluetooth module 1512 receives the online packet that includes the network identifier of the device network to which the Bluetooth module 1512 belongs, the Bluetooth module 1512 sends the online packet to a function module 1511 (an arrow 1403). The function module 1511 determines, based on the online packet, that the device B15 is online.

In an application scenario shown in FIG. 11, the Bluetooth module 1522 of the device B15 releases a broadcast packet based on the Bluetooth low energy technology. Therefore, even if the device B15 is in a sleep state, the device B15 can still release an online packet.

Further, the function module 1521 of the device B15 is a function module that can be enabled in a sleep state, for example, a system-on-a-chip (System-on-a-Chip, SOC), a microcontroller unit (Microcontroller Unit, MCU), or the like (for example, a sensor hub (Sensor Hub) with low power consumption) that may be enabled in a sleep state. The process of generating the online packet does not require participation of a primary processing module 1520 of the device B15. Therefore, even if the device B15 is in a sleep state, the device B13 may generate and release an online packet without being woken up.

Further, the Bluetooth module 1512 of the device A15 releases/receives a broadcast packet based on the Bluetooth low energy technology. Therefore, even if the device A15 is in a sleep state, the device A15 may still receive an online packet.

Further, the function module 1511 of the device A15 is a function module that can be enabled in a sleep state, for example, a system-on-a-chip (System-on-a-Chip, SOC), a microcontroller unit (Microcontroller Unit, MCU), or the like (for example, a sensor hub (Sensor Hub) with low power consumption) that may be enabled in a sleep state. The process of determining an online device based on the online packet does not require participation of a primary processing module 1510 of the device A15. Therefore, even if the device A15 is in a sleep state, an online device can be determined without waking up the device A15. If the device A15 is woken up and needs to determine a status of the online device, only a determining result of the function module 1511 needs to be directly invoked (an arrow 1504).

Further, in an actual application scenario, generation of a detection request packet, release of a detection request packet, receiving of a detection response packet, and determining of an online device all need to occupy a specific communication/processing resource, and consequently, a specific power consumption is caused. However, for a power-sensitive device (for example, a mobile phone or a tablet computer powered by a battery), power consumption needs to be reduced as much as possible. Therefore, in an embodiment of this application, when a power-sensitive device needs to determine an online device, the device does not directly detect the online device, but a non-power-sensitive device (for example, a desktop computer, a Bluetooth sound box, a smart television, or the like that is powered by a fixed power supply) performs online device detection to obtain an online device detection result, and the power-sensitive device obtains the online device detection result from the non-power-sensitive device that performs the online device detection.

Specifically, in an embodiment of this application:

when a device A17 in a device network has an online device detection requirement, the device A17 sends an online device detection request to a device B17 in the device network;

when the device B17 receives the online device detection request, the device B17 releases a detection request packet by broadcast based on a Bluetooth low energy technology, where the detection request packet is a BLE broadcast packet, the detection request packet includes a network identifier of a device network on which online device detection is performed, and the network identifier in the detection request packet is used to enable a device receiving the detection request packet to determine whether the device network at which the detection request packet is targeted is a device network to which the device receiving the detection request packet belongs;

an online device in the device network receives a broadcast packet based on the Bluetooth low energy technology, where when an online device C17 in the device network receives the detection request packet, the device C17 generates, based on the detection request packet, a detection response packet including the network identifier, and releases the detection response packet by broadcast based on the Bluetooth low energy technology, where the detection response packet is a BLE broadcast packet, and the network identifier included in the detection response packet is consistent with that in the detection request packet;

the device B17 receives a broadcast packet based on the Bluetooth low energy technology to obtain an online device detection result, where when the device B17 receives the detection response packet released by the device C17, the device B17 determines that the device C17 is online; and the device A17 obtains the online device detection result from the device B17, for example, the device B17 sends the online device detection result to the device A17 after completing the online device detection, or the device A17 reads the online device detection result stored in the device B17.

Figure 12:
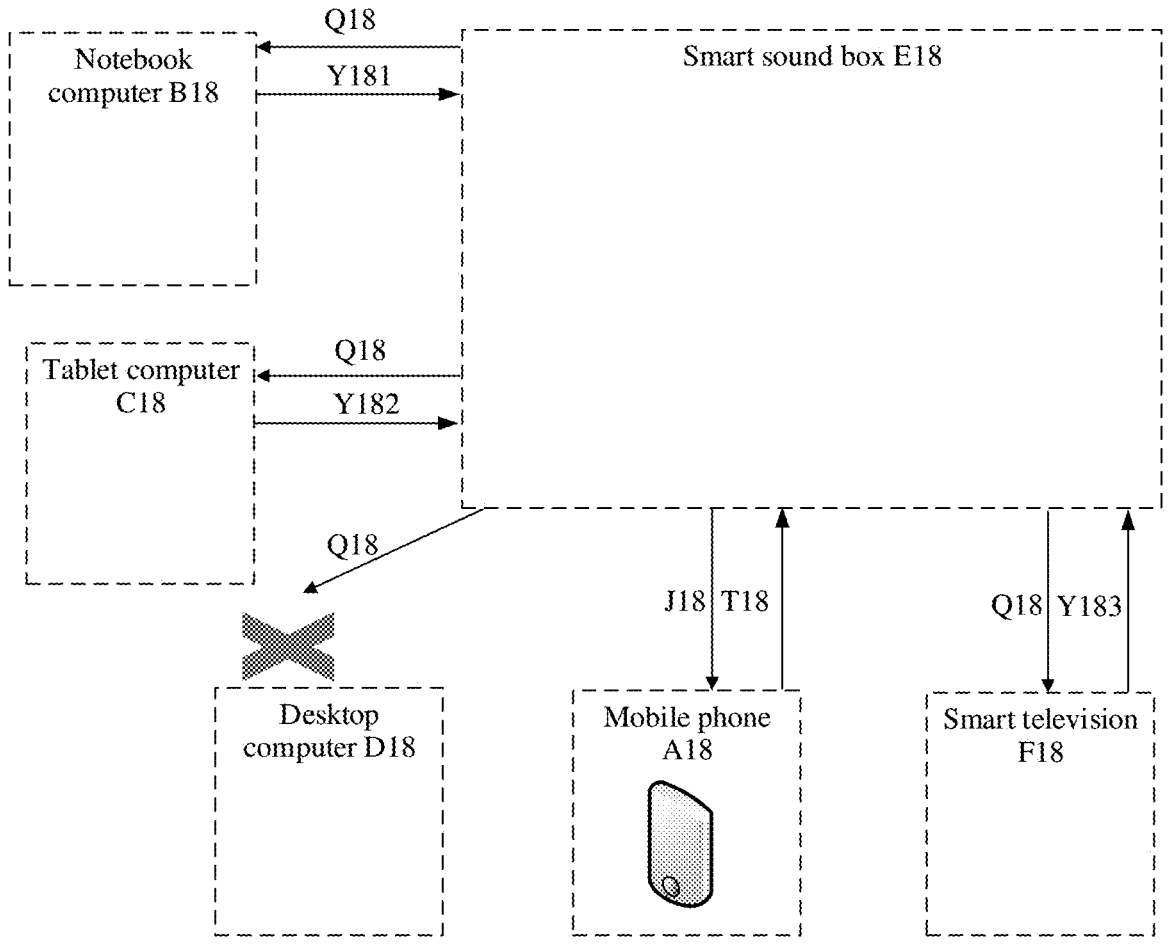
FIG. 12 is a schematic diagram of an application scenario according to an embodiment of this application.

As shown in FIG. 12, a mobile phone A18, a notebook computer B18, a tablet computer C18, a desktop computer D18, a smart sound box E18, and a smart television F18 all belong to a device network Z18. It is assumed that at a moment, the mobile phone A18, the notebook computer B18, and the smart sound box E18 are in a working state (a screen-on state), the tablet computer C18 and the smart television F18 are in an online sleep state, and the desktop computer D18 is powered off and goes offline.

In an application scenario, a user needs to send a document file on the mobile phone A18 to an online device in the device network Z18 by using the mobile phone A18 to implement data backup, and the mobile phone A18 needs to display online devices in the device network Z18 to the user for the user to choose a sending target of the document file. In this case, the mobile phone A18 needs to determine the online devices in the device network Z18.

The mobile phone A18 sends an online device detection request (T18) to the smart sound box E18 powered by a fixed power supply. After receiving the online device detection request (T18), the smart sound box E18 sends, to a peripheral device by using a BLE technology, a detection request packet Q18 that includes a network identifier of the device network Z18. The notebook computer B18 is in a working state, and may receive, based on the BLE technology, the detection request packet Q18 of the smart sound box E18. The notebook computer B18 feeds back, to the smart sound box E18, a detection response packet Y181 that includes the network identifier of the device network Z18. The desktop computer D3 is in a power-off offline state, and cannot receive the detection request packet Q8 and feed back the detection response packet to the smart sound box E18. The tablet computer C18 and the smart television F18 are in the online sleep state. In the sleep state, the tablet computer C18 and the smart television F18 may still enable the BLE. Therefore, the tablet computer C18 and the smart television F18 may also receive the detection request packet Q18. In addition, because the tablet computer C18 and the smart television F18 belong to the device network Z18, the tablet computer C18 feeds back, to the smart sound box E18, a detection response packet Y182 that includes the network identifier of the device network Z18, and the smart television F18 feeds back, to the smart sound box E18, a detection response packet Y183 that includes the network identifier of the device network Z18.

Finally, after releasing the detection request packet, the smart sound box E18 receives detection response packets of the notebook computer B18, the tablet computer C18, and the smart television F18. Therefore, the smart sound box E18 determines that the notebook computer B18, the tablet computer C18, and the smart television F18 are online. The smart sound box E18 sends an online device detection result to the mobile phone A18 (J18). The mobile phone A18 determines, based on feedback of the smart sound box E18, that the notebook computer B18, the tablet computer C18, and the smart television F18 are online, and the user may choose to send the document file to the notebook computer B3, the tablet computer C3, or the smart television F18 to implement document file backup.

In the foregoing process, the mobile phone A18 may obtain the online device detection result without performing a specific online device detection operation, thereby greatly reducing power consumption of the mobile phone A18.

However, with the development of technologies, improvements in many method processes today can be considered as direct improvements in hardware circuit structures. Design personnel almost all obtain a corresponding hardware circuit structure by programming an improved method process to a hardware circuit. Therefore, an improvement of a method process can be implemented by a hardware entity module. For example, a programmable logic device (Programmable Logic Device, PLD) (for example, a field programmable gate array (Field Programmable Gate Array, FPGA)) is such an integrated circuit, and a logic function of the programmable logic device is determined by an accessing party by programming a device. The design personnel program to "integrate" a digital apparatus into one PLD without a need for a chip manufacturer to design and manufacture an application-specific integrated circuit chip. In addition, today, instead of manually making an integrated circuit chip, such programming is also mostly implemented by using "logic compiler (logic compiler)" software. The "logic compiler" software is similar to a software compiler used during program development and writing, and original code to be compiled is also written in a specific programming language, for example, a hardware description language (Hardware Description Language, HDL). A person skilled in the art should also be aware that, a hardware circuit that implements a logic method process can be easily obtained provided that logic programming is slightly performed on the method process by using the foregoing several hardware description languages and the method process is programmed into an integrated circuit.

In the description of embodiments of this application, for ease of description, the hardware is described through function division into various modules. Division into modules/ units is merely division of logical functions. During implementation of embodiments of this application, functions of the modules/units may be implemented in one or more pieces of software and/or hardware.

Specifically, in an actual implementation, all or some of the hardware device, the apparatuses, and the modules provided in embodiments of this application may be integrated into one physical entity, or may be physically separated. In addition, all of the modules may be implemented in a form of software invoked by a processing element or in a form of hardware. Alternatively, some of the modules may be implemented in a form of software invoked by a processing element, and some modules may be implemented in a form of hardware. For example, a detection module may be a separately disposed processing element, or may be integrated into a chip of an electronic device for implementation. An implementation of another module is similar to the implementation of the detection module. In addition, all or some of these modules may be integrated together, or may be implemented independently. In an implementation process, steps in the foregoing methods or the foregoing modules can be implemented by using a hardware integrated logical circuit in the processing element, or by using instructions in a form of software.

For example, the foregoing modules may be configured as one or more integrated circuits for implementing the foregoing methods, for example, one or more application-specific integrated circuits (Application-Specific Integrated Circuit, ASIC), one or more digital signal processors (Digital Signal Processor, DSP), or one or more field programmable gate arrays (Field Programmable Gate Array, FPGA). For another example, the modules may be integrated together and implemented in a form of a system-on-a-chip (System-On-a-Chip, SOC).

An embodiment of this application further provides an electronic device. The electronic device includes a memory configured to store computer program instructions and a processor configured to execute the program instructions. When the computer program instructions are executed by the processor, the electronic device is triggered to perform the steps of the method for detecting an online device described in embodiments of this application.

An embodiment of this application further provides an electronic device. The electronic device includes a memory configured to store computer program instructions and a processor configured to execute the program instructions. When the computer program instructions are executed by the processor, the electronic device is triggered to perform the steps of the method for feeding back an online status described in embodiments of this application.

Specifically, in an embodiment of this application, the one or more computer programs are stored in the memory, the one or more computer programs include instructions, and when the instructions are executed by the device, the device is enabled to perform the steps of the method in embodiments of this application.

Specifically, in an embodiment of this application, the processor of the electronic device may be a system-on-a-chip SOC, and the processor may include a CPU, or may further include a processor of another type. Specifically, in an embodiment of this application, the processor of the electronic device may be a PWM control chip.

Specifically, in an embodiment of this application, the processor may include, for example, a CPU, a DSP, a microcontroller, or a digital signal processor, and may further include a GPU, an embedded neural-network processing unit (Neural-network Processing Unit, NPU), and an image signal processor (Image Signal Processor, ISP). The processor may further include a necessary hardware accelerator or a logic processing hardware circuit, for example, an ASIC, or one or more integrated circuits configured to control program execution of the technical solutions in this application. In addition, the processor may have a function of operating one or more software programs. The software program may be stored in a storage medium.

Specifically, in an embodiment of this application, the memory of the electronic device may be a read-only memory (read-only memory, ROM) or another type of static storage device that can store static information and instructions, or a random access memory (random access memory, RAM) or another type of dynamic storage device that can store information and instructions. The memory may alternatively be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any computer-readable medium that can be used to carry or store expected program code in a form of an instruction or a data structure and that can be accessed by a computer.

Specifically, in an embodiment of this application, the processor and the memory may be integrated into one processing apparatus, and more commonly, are components independent of each other. The processor is configured to execute program code stored in the memory to implement the methods in embodiments of this application. In a specific implementation, the memory may alternatively be integrated into the processor, or independent of the processor.

Further, the devices, the apparatuses, the apparatuses, the modules, or the units described in embodiments of this application may be specifically implemented by a computer chip or an entity, or may be implemented by a product having a function.

A person skilled in the art should understand that embodiments of this application may be provided as a method, an apparatus, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media that include computer-usable program code.

In embodiments of this application, when any of the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions to enable a computer device (which may be a personal computer, a server, a network device, or the like) to perform all or some of the steps of the methods described in embodiments of this application.

Specifically, an embodiment of this application further provides a computer-readable storage medium. The computer-readable storage medium stores a computer program, and when the computer program is run on a computer, the computer is enabled to perform the methods provided in embodiments of this application.

An embodiment of this application further provides a computer program product. The computer program product includes a computer program. When the computer program is run on a computer, the computer is enabled to perform the methods provided in embodiments of this application.

Embodiments of this application is described with reference to the flowcharts and/or block diagrams of the methods, the devices (apparatuses), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

It should be noted that, in embodiments of this application, "at least one" means one or more, and "a plurality of" means two or more. The term "and/or" describes an association relationship between associated objects and indicates that three relationships may exist. For example, A and/or B may indicate the following three cases: Only A exists, both A and B exist, and only B exists. A and B may be in a singular form or a plural form. The character "/" generally indicates an "or" relationship between the associated objects. "At least one of the following items" and a similar expression refer to any combination of these items, including a single item or any combination of a plurality of items. For example, at least one of a, b, and c may indicate a, b, c, a and b, a and c, b and c, or a, b, and c, where a, b, and c may be singular or plural.

In embodiments of this application, the terms "include" or any other variant thereof is intended to cover a non-exclusive inclusion, so that a process, a method, a commodity, or a device that includes a list of elements not only includes those elements but also includes other elements that are not expressly listed, or further includes elements inherent to such a process, method, commodity, or device. An element preceded by "includes a . . . " does not, without more constraints, preclude the existence of additional identical elements in the process, method, commodity, or device that includes the element.

This application can be described in the general context of computer-executable instructions executed by a computer, for example, a program module. Generally, the program module includes a routine, program, object, component, data structure, and the like for performing a particular task or implementing a particular abstract data type. This application may be practiced in distributed computing environments in which tasks are performed by remote processing devices that are connected through a communication network. In a distributed computing environment, program modules may be located in both local and remote computer storage media including storage devices.

Embodiments in this application are all described in a progressive manner, for same or similar parts in embodiments, refer to these embodiments, and each embodiment focuses on a difference from other embodiments. Especially, an apparatus embodiment is basically similar to a method embodiment, and therefore is described briefly; for related parts, refer to partial descriptions in the method embodiment.

A person of ordinary skill in the art may be aware that units and algorithm steps described in embodiments of this application may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing apparatus, apparatus and unit, refer to a corresponding process in the foregoing method embodiments, and details are not described herein again.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A method, comprising:
   broadcasting a detection request packet based on a Bluetooth Low Energy (BLE) technology, wherein the detection request packet is a BLE broadcast packet, the detection request packet comprises a network identifier of a device network on which online device detection is performed, and the network identifier in the detection request packet is used to enable a device receiving the detection request packet to determine whether the device network at which the detection request packet is targeted is a device network to which the device receiving the detection request packet currently belongs;
   receiving, based on the BLE technology, a detection response packet that is broadcast and that comprises the network identifier, wherein the detection response packet is a BLE broadcast packet, and the detection response packet is generated based on the detection request packet after the detection request packet is received by an online device currently in the device network on which online device detection is performed, and the detection response packet indicates the device sending the detection response packet currently belongs to the device network and is an online device in the device network; and determining the online device in the device network based on the detection response packet.

2. The method according to claim 1, wherein data content types of the detection request packet and the detection response packet each are set to a user-defined type, and the network identifier is written into data content of the detection request packet and the detection response packet.

3. The method according to claim 1, wherein the detection response packet comprises a device identifier of the online device that sends the detection response packet.

4. The method according to claim 1, wherein receiving, based on the BLE technology, the detection response packet that is broadcast and that comprises the network identifier comprises:

receiving, based on the BLE technology, the detection response packet that is broadcast and that comprises the network identifier of the device network on which online device detection is performed and a packet identifier of a device that sends the detection request packet.

5. The method according to claim 4, wherein the detection request packet comprises the packet identifier of the device that sends the detection request packet.

6. The method according to claim 4, wherein receiving, based on the BLE technology, the detection response packet that is broadcast and that comprises the network identifier and the packet identifier of the device that sends the detection request packet comprises:

receiving a BLE packet based on a preset first filter condition to receive the detection response packet, wherein the first filter condition comprises:

the detection response packet is the BLE broadcast packet;

the detection response packet comprises the packet identifier of the device that receives the detection response packet; and the detection response packet comprises the network identifier of the device network on which online device detection is performed.

7. The method according to claim 1, wherein based on a function module that is configured to be enabled in a sleep state, the detection request packet is generated, or the online device in the device network is determined.

8. The method according to claim 1, wherein the detection request packet is broadcast, the detection response packet is received, and the online device in the device network is determined, periodically based on a preset first time interval.

9. The method according to claim 1, further comprising:

receiving, based on the BLE technology, an online packet that is broadcast and that comprises a network identifier of the device network to which the device that sends the detection request packet belongs, wherein the online packet is a BLE broadcast packet, and the online packet is broadcast periodically based on a preset second time interval by an online device in the device network to which the device that sends the detection request packet belongs; and determining, based on the online packet, the online device in the device network to which the device that sends the detection request packet belongs.

10. A method, comprising:

receiving a broadcast packet based on a Bluetooth Low Energy (BLE) technology, and when the broadcast packet comprises a detection request packet comprising a network identifier of a device network to which a device that receives the broadcast packet currently belongs, generating, based on the detection request packet, a detection response packet comprising the network identifier; and broadcasting the detection response packet based on the BLE technology, wherein:

the detection request packet is a BLE broadcast packet;

the detection response packet is a BLE broadcast packet;

the detection response packet indicates the device sending the detection response packet currently belongs to the device network and is an online device in the device network; and the network identifier comprised in the detection response packet is consistent with the network identifier in the detection request packet, and the network identifier in the detection response packet is used to: when a device that broadcasts the detection request packet receives the detection response packet, enable the device that receives the detection response packet to determine whether the detection response packet corresponds to the detection request packet.

11. The method according to claim 10, wherein the detection response packet further comprises a device identifier of a device that receives the detection request packet, and the device identifier in the detection response packet is used to enable the device that broadcasts the detection request packet to identify an identity of the device that receives the detection request packet when the device that broadcasts the detection request packet receives the detection response packet.

12. The method according to claim 10, wherein the detection request packet comprises a packet identifier of the device that broadcasts the detection request packet, and the packet identifier in the detection request packet is used to:

when the device that broadcasts the detection request packet receives the detection response packet, enable the device that broadcasts the detection request packet to determine whether the detection response packet corresponds to the device that broadcasts the detection request packet.

13. The method according to claim 10, wherein receiving the broadcast packet based on the BLE technology comprises:

receiving a BLE packet based on a preset second filter condition to receive the detection request packet, wherein the second filter condition comprises:

the detection request packet is the BLE broadcast packet; and the detection response packet comprises the network identifier of the device network to which the device that receives the detection request packet belongs.

14. The method according to claim 10, wherein the detection response packet is generated based on a function module that is configured to be enabled in a sleep state.

15. The method according to claim 10, further comprising:

periodically broadcasting an online packet based on the BLE technology based on a preset second time interval, wherein:

the online packet is a BLE broadcast packet; and the online packet comprises the network identifier of the device network to which the device that receives the detection request packet belongs.

16. An electronic device, comprising:

a memory configured to store computer program instructions; and at least one processor configured to execute the program instructions, and when the computer program instructions are executed by the processor, the electronic device is triggered to perform operations comprising:

broadcasting a detection request packet based on a Bluetooth Low Energy (BLE) technology, wherein the detection request packet is a BLE broadcast packet, the detection request packet comprises a network identifier of a device network on which online device detection is performed, and the network identifier in the detection request packet is configured to enable a device receiving the detection request packet to determine whether the device network at which the detection request packet is targeted is a device network to which the device receiving the detection request packet currently belongs;

receiving, based on the BLE technology, a detection response packet that is broadcast and that comprises the network identifier, wherein the detection response packet is the BLE broadcast packet, and the detection response packet is generated, based on the detection request packet after the detection request packet is received, by an online device currently in the device network on which online device detection is performed, and the detection response packet indicates the device sending the detection response packet currently belongs to the device network and is an online device in the device network; and determining the online device in the device network based on the detection response packet.

17. The electronic device according to claim 16, wherein data content types of the detection request packet and the detection response packet each are set to a user-defined type, and the network identifier is written into data content of the detection request packet and the detection response packet.

18. The electronic device according to claim 16, wherein the detection response packet comprises a device identifier of the online device that sends the detection response packet, and the detection request packet comprises a packet identifier of the device that sends the detection request packet.

19. The electronic device according to claim 16, wherein receiving, based on the BLE technology, the detection response packet that is broadcast and that comprises the network identifier comprises:

receiving, based on the BLE technology, the detection response packet that is broadcast and that comprises the network identifier of the device network on which online device detection is performed and a packet identifier of a device that sends the detection request packet.

20. The electronic device according to claim 19, wherein receiving, based on the BLE technology, the detection response packet that is broadcast and that comprises the network identifier and the packet identifier of the device that sends the detection request packet comprises:

receiving a Bluetooth low energy packet based on a preset first filter condition to receive the detection response packet, wherein the first filter condition comprises:

the detection response packet is a BLE broadcast packet;

the detection response packet comprises the packet identifier of the device that receives the detection response packet; and the detection response packet comprises the network identifier of the device network on which online device detection is performed.

*    *    *    *    *